US011345219B2

(12) United States Patent
Getzschman et al.

(10) Patent No.: US 11,345,219 B2
(45) Date of Patent: May 31, 2022

(54) DOOR UPPER

(71) Applicant: Bestop, Inc., Louisville, CO (US)

(72) Inventors: Eric D. Getzschman, New Baltimore, MI (US); George C. Stickles, Thornton, CO (US); William H. Haberkamp, Rochester Hills, MI (US); Stephen J. Lewis, Harrison Township, MI (US)

(73) Assignee: Bestop, Inc., Louisville, CO (US)

( * ) Notice: Subject to any disclaimer, the term of this patent is extended or adjusted under 35 U.S.C. 154(b) by 151 days.

(21) Appl. No.: 16/813,091

(22) Filed: Mar. 9, 2020

(65) Prior Publication Data

US 2020/0207190 A1 Jul. 2, 2020

Related U.S. Application Data

(63) Continuation-in-part of application No. 16/173,881, filed on Oct. 29, 2018, now Pat. No. 11,135,906, which is a continuation-in-part of application No. 15/915,960, filed on Mar. 8, 2018, now Pat. No. 11,135,905.

(60) Provisional application No. 62/815,806, filed on Mar. 8, 2019, provisional application No. 62/750,625, filed on Oct. 25, 2018, provisional application No. 62/640,317, filed on Mar. 8, 2018, provisional application No. 62/468,666, filed on Mar. 8, 2017.

(51) Int. Cl.
 *B60J 5/04* (2006.01)
 *B60J 1/10* (2006.01)

(52) U.S. Cl.
 CPC .............. *B60J 5/0402* (2013.01); *B60J 1/10* (2013.01); *B60J 5/0469* (2013.01)

(58) Field of Classification Search
 CPC . B60J 5/0402; B60J 5/0469; B60J 1/10; B60J 5/0476; B60J 5/0487
 USPC .................................. 296/146.2, 190.11, 148
 See application file for complete search history.

(56) References Cited

U.S. PATENT DOCUMENTS

| 3,940,177 | A | | 2/1976 | Miers et al. | |
|---|---|---|---|---|---|
| 4,644,699 | A | * | 2/1987 | Chandler | B60J 5/0487 296/146.2 |
| 4,914,863 | A | * | 4/1990 | Laukhuf | B60J 5/0419 296/146.2 |
| 6,036,255 | A | * | 3/2000 | Lester | B60J 5/0416 296/146.1 |
| 6,343,832 | B1 | | 2/2002 | Queener et al. | |
| 6,886,881 | B1 | * | 5/2005 | Henderson | B60J 1/08 296/146.2 |

(Continued)

*Primary Examiner* — D Glenn Dayoan
*Assistant Examiner* — E Turner Hicks
(74) *Attorney, Agent, or Firm* — Warn Partners, P.C.

(57) ABSTRACT

A side door assembly is provided for an automotive vehicle body having a side opening. The side door assembly includes an upper door half incorporating a unique outer panel coupled to or integrally formed with a structural portion. Soft goods are operably coupled to the structural portion of the upper door half. The side door assembly includes a one-piece casting for hinged connection to the vehicle body. The casting forms a frame. At least one panel insert is selectively connected from the interior of the vehicle outward by a plurality of rotary attachment features to the frame. The frame includes a plurality of reinforcement features to add structure and rigidity, while reducing weight, to the side door assembly.

22 Claims, 36 Drawing Sheets

(56) References Cited

U.S. PATENT DOCUMENTS

| | | | | |
|---|---|---|---|---|
| 7,073,847 | B2 * | 7/2006 | Morrow | B60J 5/0497 |
| | | | | 296/146.13 |
| 7,125,067 | B2 * | 10/2006 | Bonnett | B60J 5/0416 |
| | | | | 296/146.6 |
| 8,720,977 | B2 * | 5/2014 | Nakamura | B60J 5/0405 |
| | | | | 296/190.11 |
| 9,527,371 | B2 * | 12/2016 | Flores | B60J 5/0487 |
| 10,106,019 | B2 | 10/2018 | Rafeld | |
| 10,501,043 | B2 | 12/2019 | Ghannam et al. | |
| 10,562,380 | B2 * | 2/2020 | Marchetti | B60J 5/0487 |
| 2004/0049989 | A1 * | 3/2004 | Florentin | B60J 5/0463 |
| | | | | 49/502 |
| 2005/0110298 | A1 * | 5/2005 | Fin | B60J 5/0487 |
| | | | | 296/146.5 |
| 2006/0181102 | A1 * | 8/2006 | Lemieux | B60R 13/0243 |
| | | | | 296/37.13 |
| 2013/0199097 | A1 | 8/2013 | Spindler et al. | |
| 2017/0203640 | A1 | 7/2017 | Rafeld | |
| 2018/0086184 | A1 | 3/2018 | Stickles et al. | |
| 2018/0297455 | A1 | 10/2018 | Hale et al. | |
| 2019/0009655 | A1 | 1/2019 | Getzschman et al. | |
| 2019/0061487 | A1 * | 2/2019 | Kleinhoffer | B60J 5/0476 |
| 2019/0061490 | A1 | 2/2019 | Getzschman et al. | |
| 2019/0092146 | A1 * | 3/2019 | Nania | B60J 5/0412 |
| 2019/0232765 | A1 * | 8/2019 | Hoffman | B60J 5/0487 |
| 2019/0232766 | A1 | 8/2019 | Patel et al. | |
| 2019/0248218 | A1 * | 8/2019 | Bell | B60J 5/065 |
| 2019/0337365 | A1 * | 11/2019 | Marchetti | B60J 5/0486 |
| 2021/0237544 | A1 * | 8/2021 | Schultz | B60J 5/0408 |

\* cited by examiner

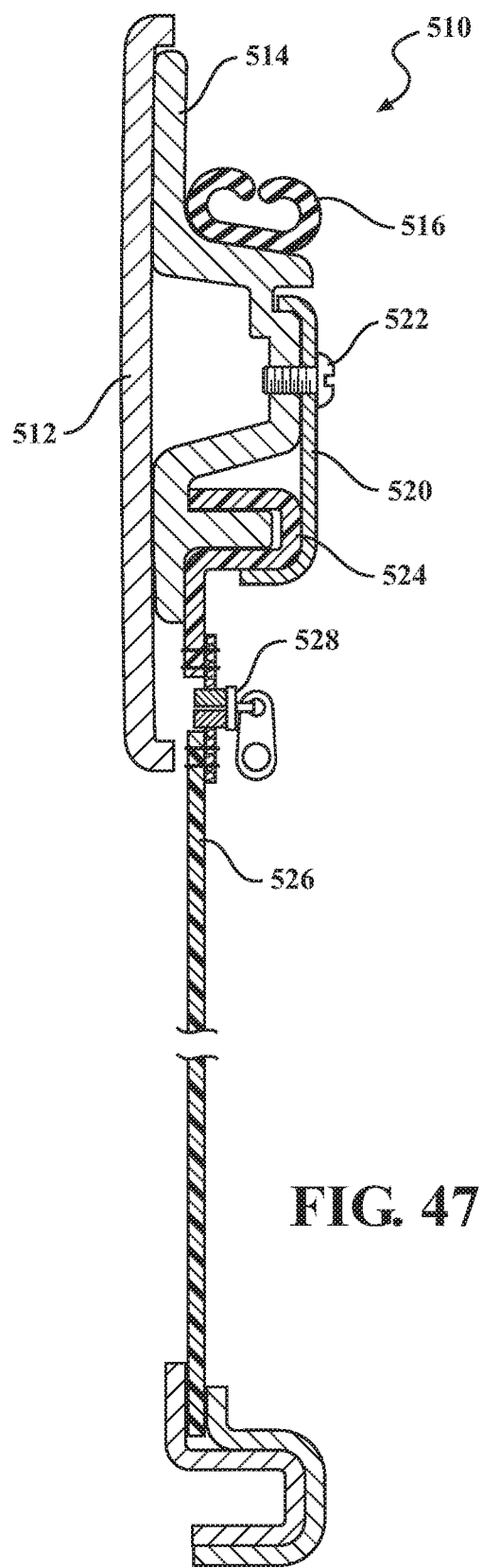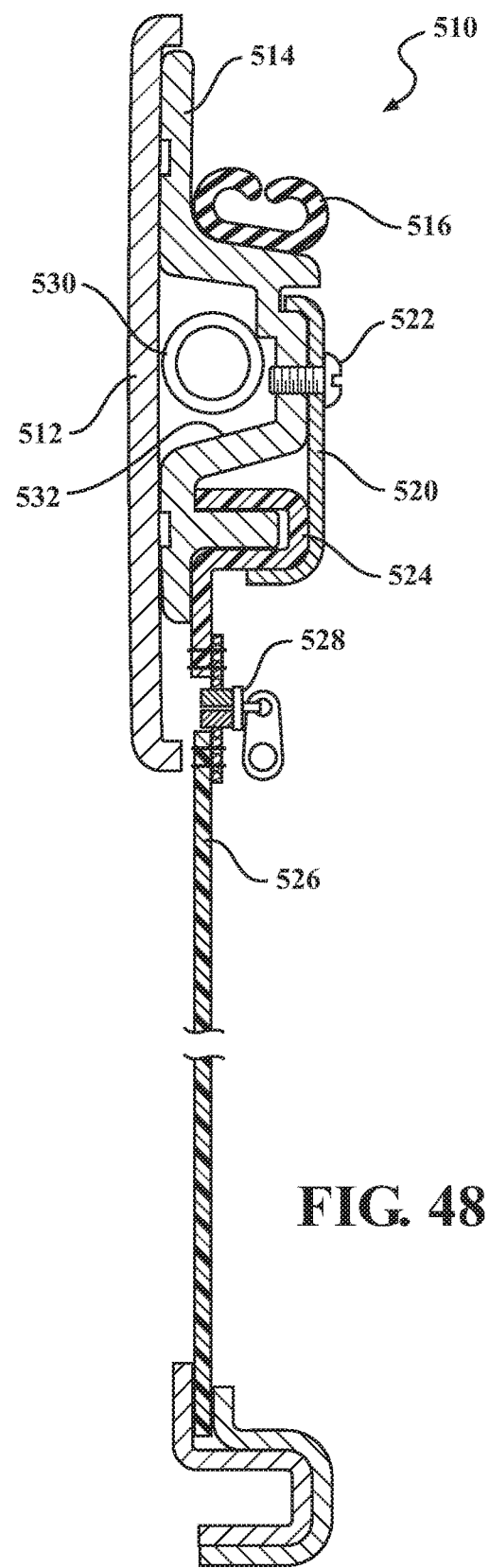

DOOR UPPER

CROSS-REFERENCE TO RELATED APPLICATIONS

This application is a Continuation-in-Part of U.S. patent application Ser. No. 16/173,881, filed Oct. 29, 2018, which is a Continuation-in-Part of U.S. patent application Ser. No. 15/915,960, filed Mar. 8, 2018, which claims benefit to U.S. Provisional Application No. 62/468,666, filed Mar. 8, 2017 and to U.S. Provisional Application No. 62/640,317, filed Mar. 8, 2018, and which U.S. patent application Ser. No. 16/173,881 also claims benefit to U.S. Provisional Application No. 62/750,625, filed Oct. 25, 2018. This application claims the benefit of U.S. Provisional Application No. 62/815,806, filed Mar. 8, 2019, and of U.S. Provisional Application No. 62/468,666, filed Mar. 8, 2017, U.S. Provisional Application No. 62/640,317, filed Mar. 8, 2018, and U.S. Provisional Application No. 62/750,625, filed Oct. 25, 2018. The disclosures of the above applications are incorporated herein by reference.

FIELD OF THE INVENTION

The field of the present invention is that of side doors for automotive vehicles, more particularly, side doors for sport utility vehicles such as those manufactured by Jeep™ and that are customizable by the owner.

BACKGROUND OF THE INVENTION

Many owners of sport utility vehicles, especially Jeeps, seek to enjoy their vehicles in the outdoors. To maximize the outdoor experience, many owners replace their original equipment side doors for other side doors that can be customized to enhance the driving experience. Often these doors allow the car operator to have greater exposure to the outdoor environment. It is desirable that these customizable doors be as rigid as possible to minimize squeaks and rattles while at the same time being as light as possible to maximize the joy of driving such a vehicle.

SUMMARY OF THE INVENTION

To make manifest the above noted and other gainful desires, a revelation of the present invention is brought forth. The present inventions endows the freedom of a side door assembly for an automotive vehicle body having a side opening. The door assembly has a front casting for hinged connection with the vehicle body. Preferably the front casting will be die cast aluminum or titanium to minimize weight. A rear casting is also provided, allowing the door to be latched to the vehicle body. An extrusion or extrusions connect front and rear castings. An optional window frame can be added to further complete the door assembly.

In a preferred embodiment, the door assembly has a one-piece casting for hinged connection with the vehicle body. Preferably the front casting is die cast aluminum or titanium to minimize weight. Preferably, the one-piece casting provides a front door hinged to the vehicle body. A one-piece second casting is also provided, allowing the door to be latched to the vehicle body. Preferably the rear casting is die cast aluminum or titanium to minimize weight. Preferably, the one-piece second casting provides a rear door hinged to the vehicle body. An optional window frame can be added to the first and/or second one-piece casting further complete the door assemblies.

In a preferred embodiment, the door assembly is provided with an upper half that includes at least one structural section and at least one panel portion (e.g., facade panel(s), cast aluminum, injection molded, painted, molded-in color, etc) operably connected to the at least one structural section (e.g., mechanical fastener, glue, clip on, press in, bonded, etc). At least one upper window is operably connected (e.g., snaps, zipper, fastener(s), etc) Preferably, at least one soft good is operably attached to the structural section or panel portion, most preferably a window (e.g., glass, vinyl, polycarbonate panel etc).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 47 is a sectional view taken at A-A of FIG. 45 including at least one structural portion and at least one outer panel, in accordance with the present invention;

FIG. 48 is a sectional view taken at A-A of FIG. 45 including at least one further structural support, in accordance with the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
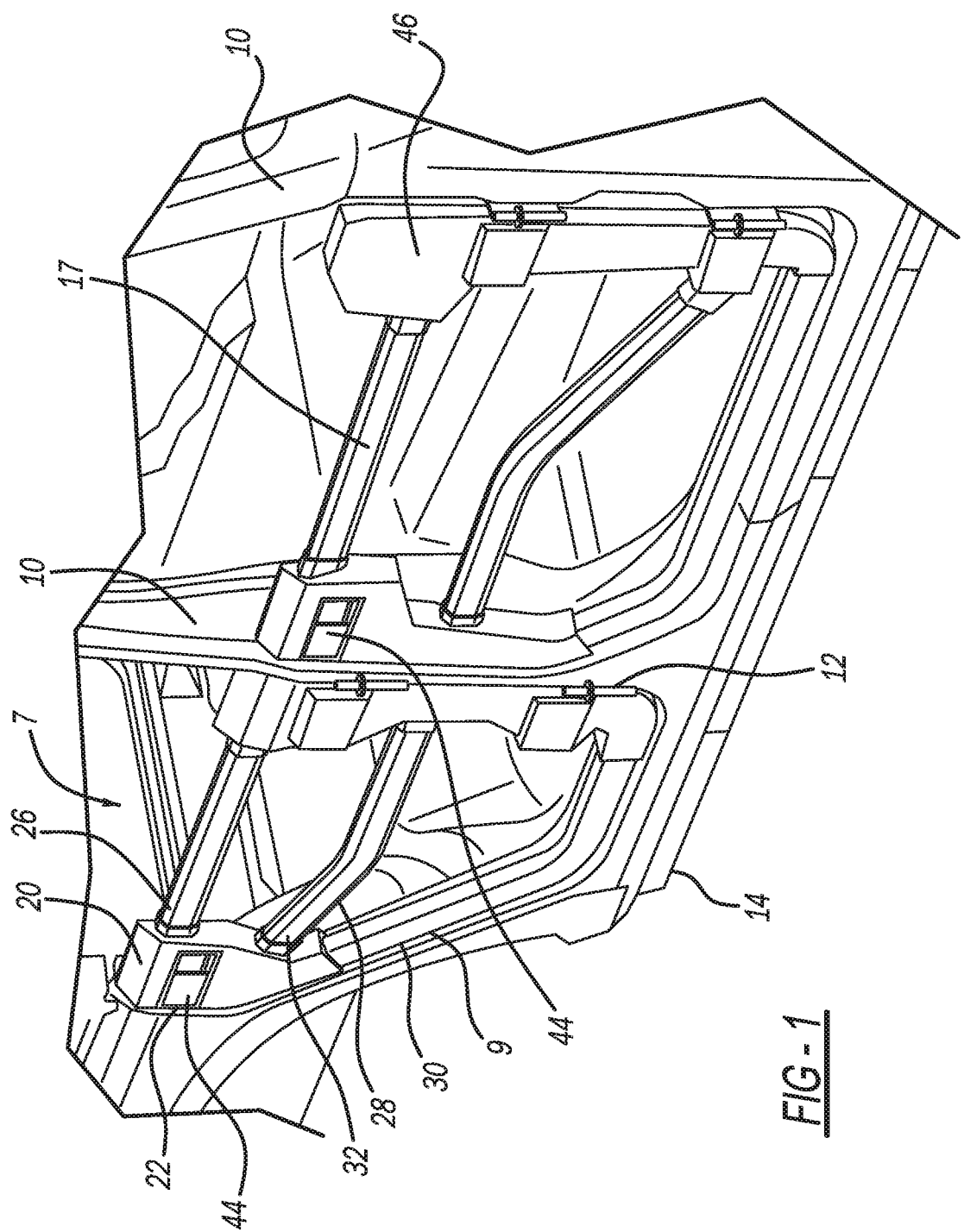
FIG. 1 is a perspective view of a preferred embodiment side door assembly according to the present invention, shown installed in a Jeep-type vehicle.
Figure 2:
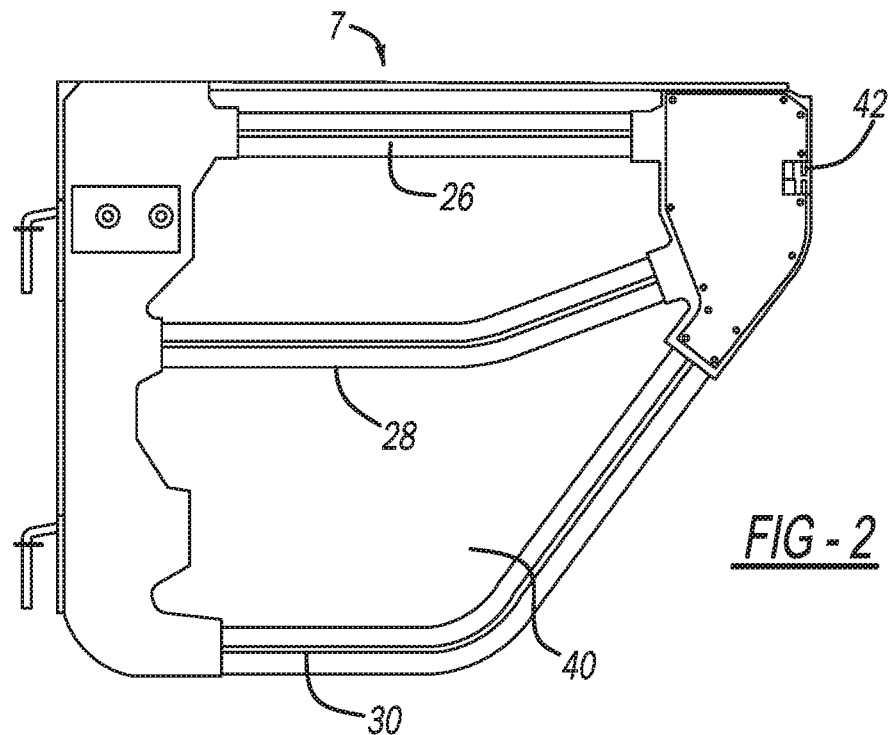
FIG. 2 is a rear plan view of rear side door assembly shown in FIG. 1.
Figure 3:
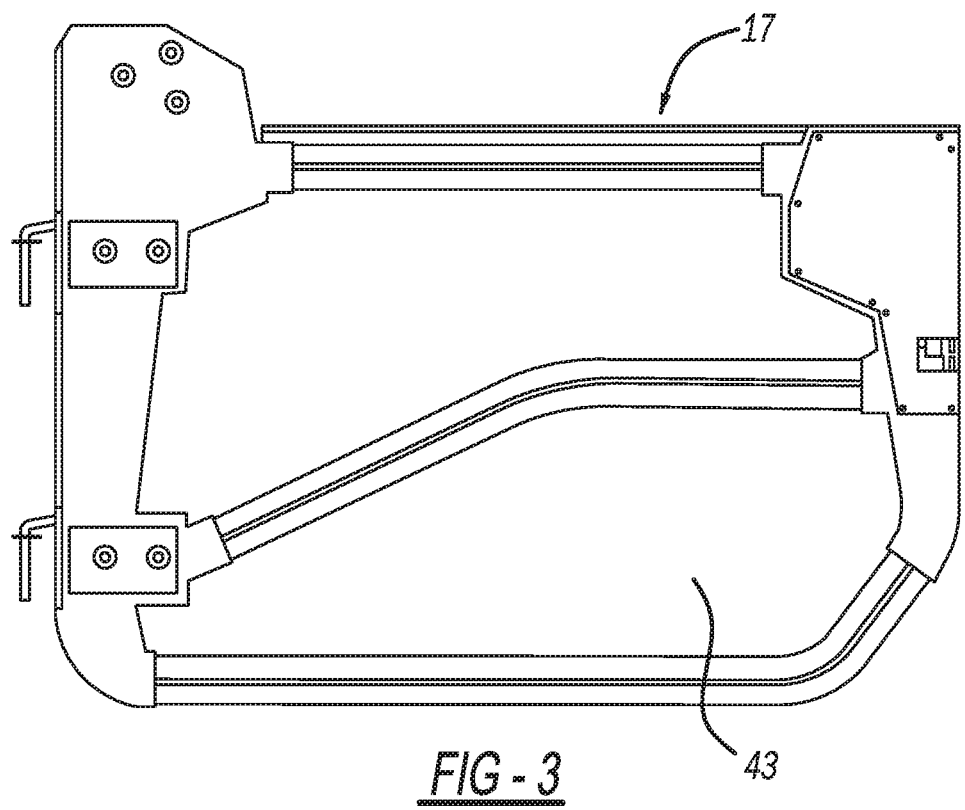
FIG. 3 is a rear plan view of the front side door assembly shown in FIG. 1.

The present invention will become more fully understood from the detailed description and the accompanying drawings, wherein:

Referring to FIGS. 1 through 3, a side door assembly 7 according to the present invention is provided. The side door assembly 7 is shown utilized to close a side door opening 9 in an automotive vehicle 10. The vehicle 10 shown is a Jeep™ automotive vehicle. As shown, side door assembly 7 is for a rear passenger compartment. Side door assembly 17 illustrates the invention utilized for a front row passenger compartment. Side door assembly 7 has a front casting 10. Casting 10 is typically fabricate from die cast aluminum or titanium. Front casting 10 is provided with upper and lower hinge pins 12 to allow the door 7 to be pivotally connected to the vehicle body 14. Typically the hinge pins are fabricate from stainless steel and are connected to the casting 10 by a press-fit or other suitable attachment method. Door assembly 7 is provided with a rear casting 20. Rear casting 20 is provided with a latch handle 22, which controls a latch mechanism (not shown) to allow the assembly to have a latched connection with vehicle body 14.

Figure 34:
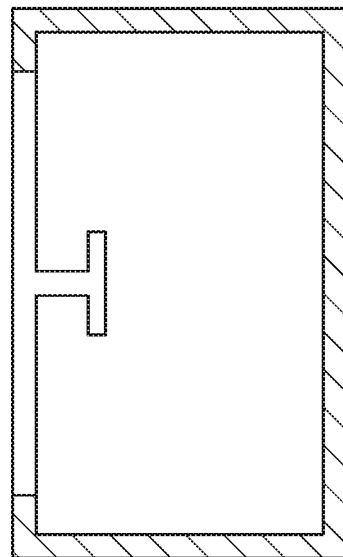
FIG. 34 is a view taken along line 34-34 of FIG. 3.
Figure 35:
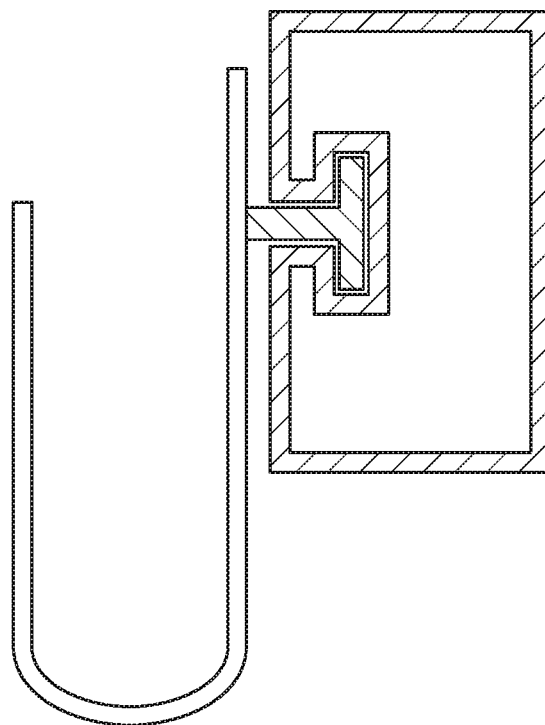
FIG. 35 is a view taken along line 35-34 of FIG. 3.

A tubular extrusion 26, fabricated from aluminum or titanium, connects front casting 10 to the rear casting 20. It will be readily appreciated that the extrusion is shown as tubular but can be shaped or have other cross-sectional shapes. As shown, door assembly 7 has two additional connective extrusions 28 and 30. Extrusion 28 has an end 32 that is connected with the rear casting 20 at a higher elevation than its frontend 34 with the front casting 10. Lower extrusion 30 has a bend 36 forming a lower portion bordering the side door opening 9. An interior side of lower extrusion 30 and lower portion of the front casting 10 have a channel mounting a sealing bulb to seal the bottom portion door assembly 7 with the door opening 9. FIG. 2 is a view of the door assembly shown in FIG. 1 from the interior of the vehicle. In FIG. 2 an outer skin 40 has been added. The upper extrusion 36 and the middle extrusion 28 have a T-slot feature (see FIGS. 34 and 35) for attachment of add-on accessories. Lower extrusion 30 also has the T-slot. A cable operated by latch handle 44 (FIG. 1) can extend through an interior of the top extrusion 26 to operate a two-stage rotary latch with anti-rattle overmold 42. Referring back to FIG. 1, latch handle 44 is a Jeep TJ-style panel latch and is at the same elevation as latch handle 22 for styling purposes. Door assembly 17 is constructed in a manner similar to that of door assembly 17, however door assembly 17 additionally has a tower 46 to allow for attachment of the rear view mirror and associated hardware.

Figure 14:
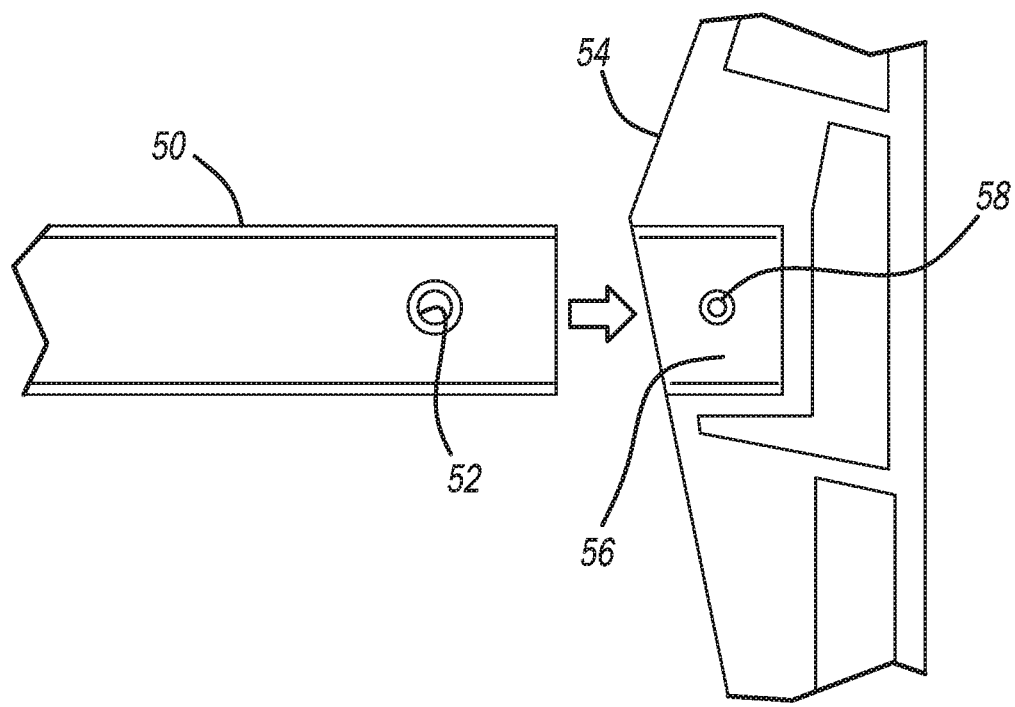
FIG. 14 is an exploded view illustrating a method of connection of an extrusion to a casting of the door assembly according to the present invention.
Figure 15:
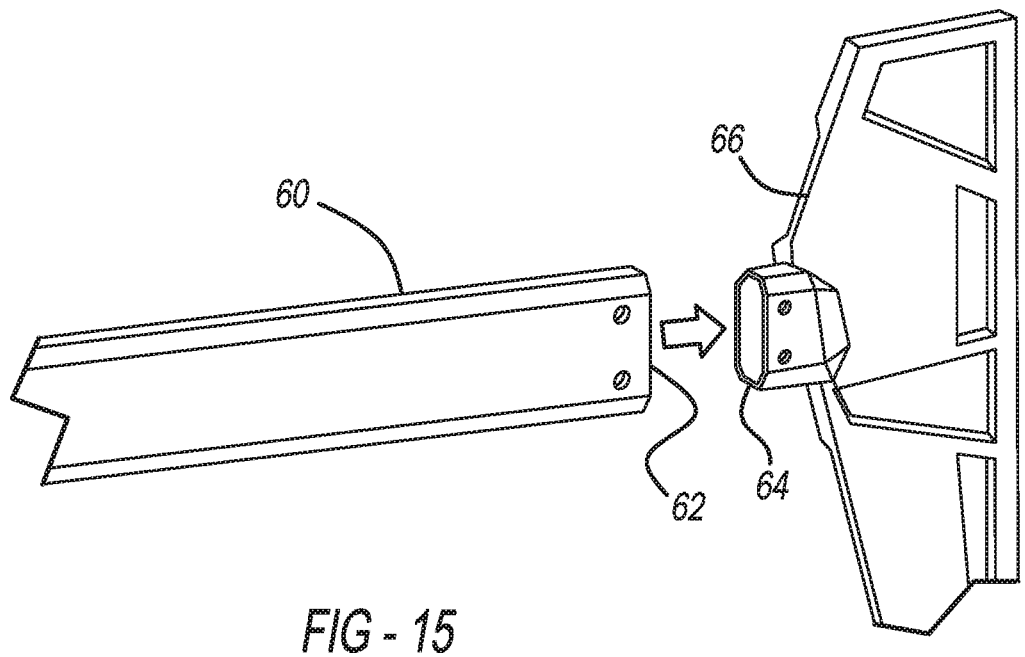
FIG. 15 is an exploded view illustrating an alternate preferred method of connection of an extrusion to a casting of the door assembly according to the present invention.
Figure 16:
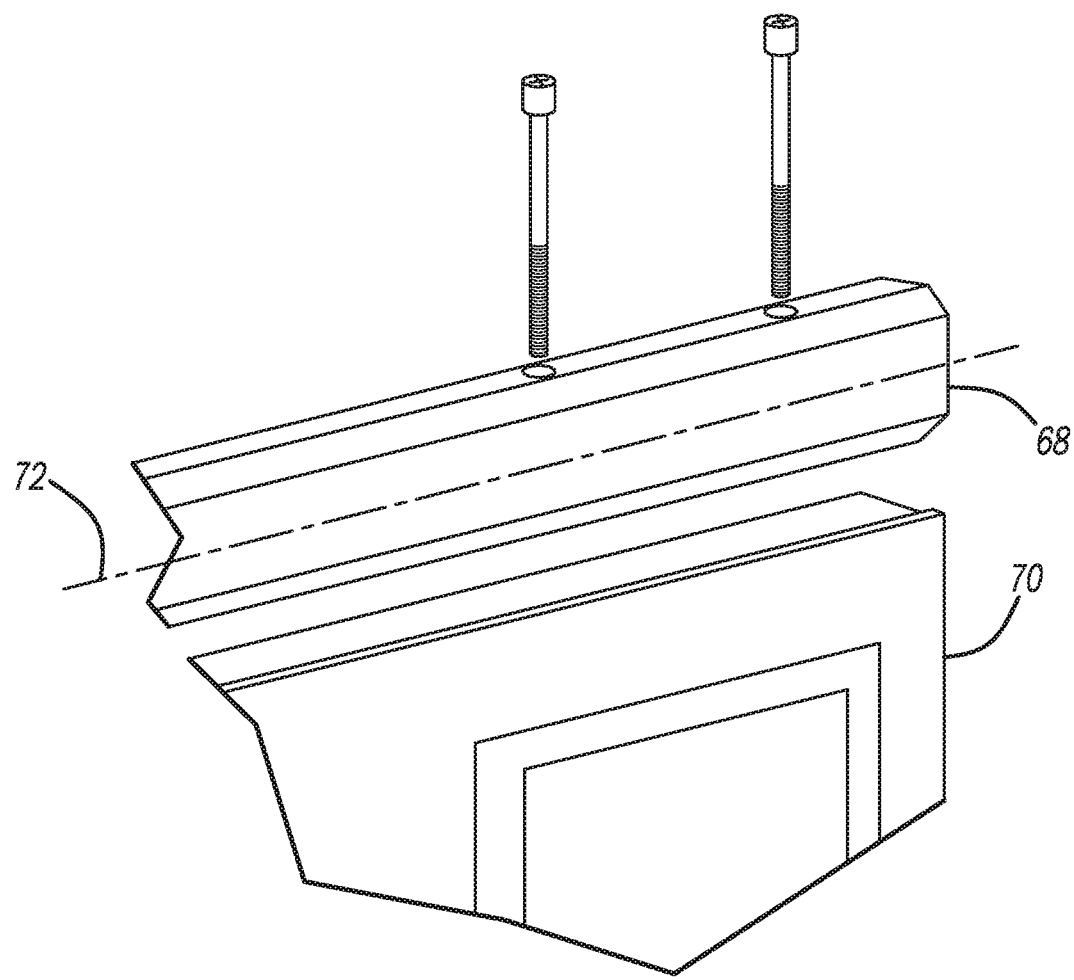
FIG. 16 is an exploded view illustrating yet another alternate method of connection of extrusion to a casting of the door assembly according to the present invention.
Figure 17:
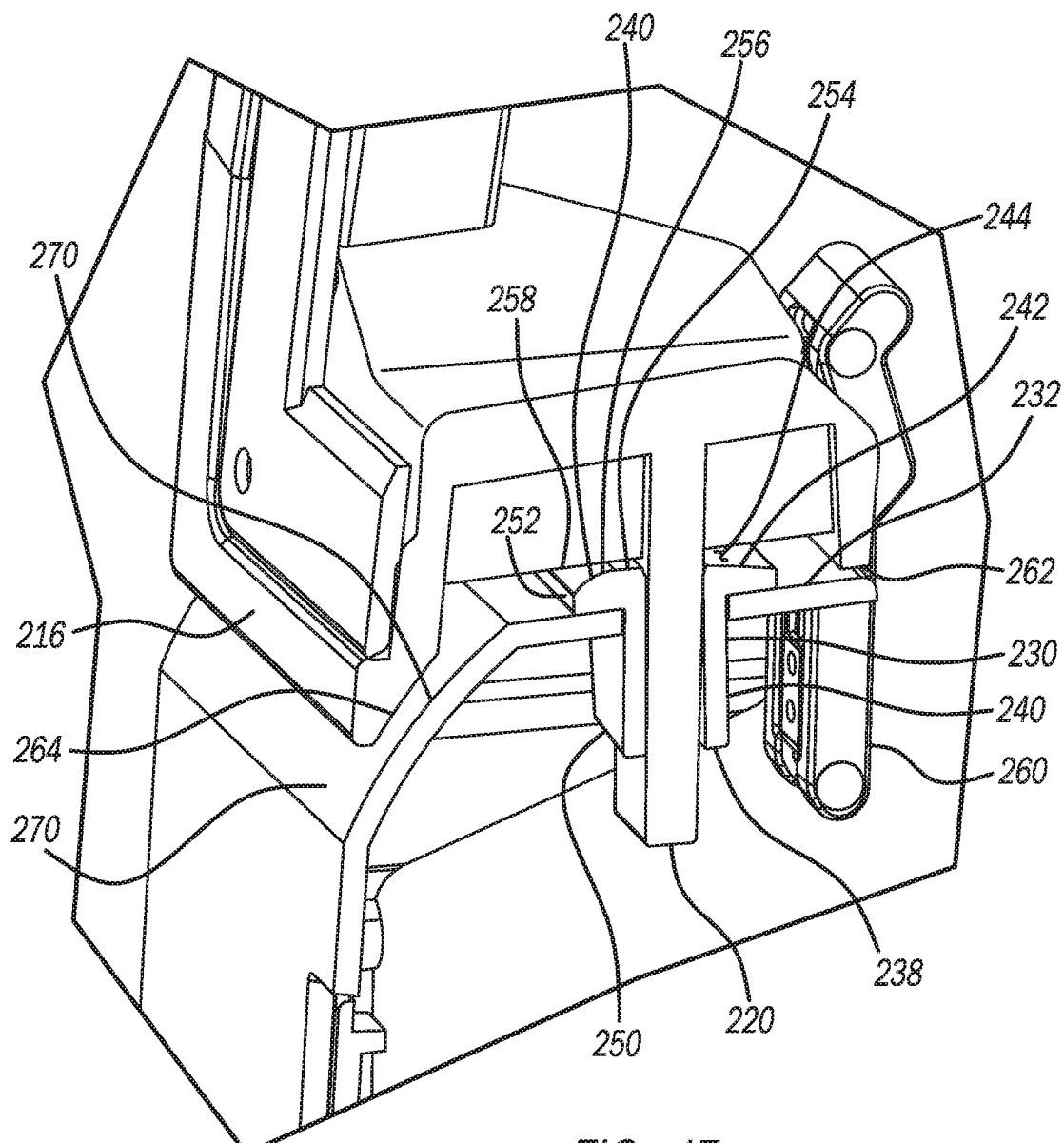
FIG. 17 is a sectioned view illustrating the connection of a portion of the window frame to the remainder of the door assembly of the present invention.
Figure 18:
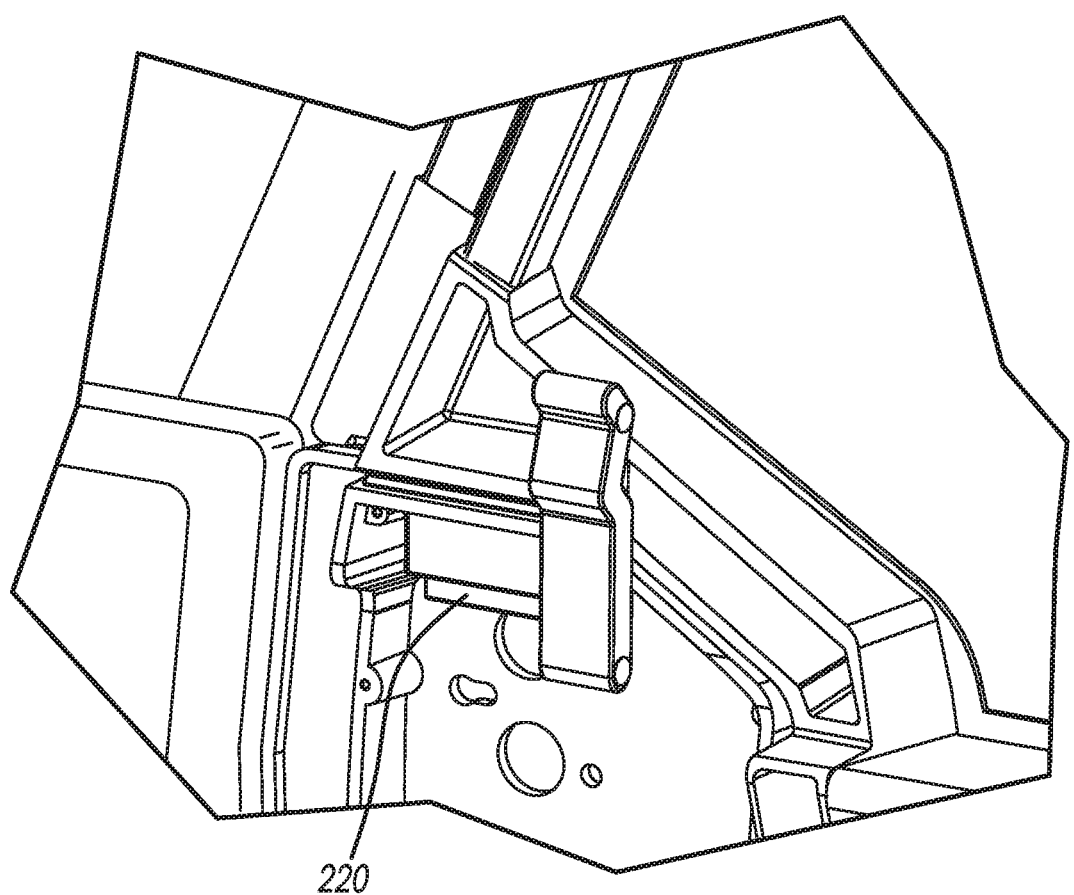
FIG. 18 is a perspective view illustrating the connection of a portion of the window frame to a front of the door assembly casting of the present invention.
Figure 19:
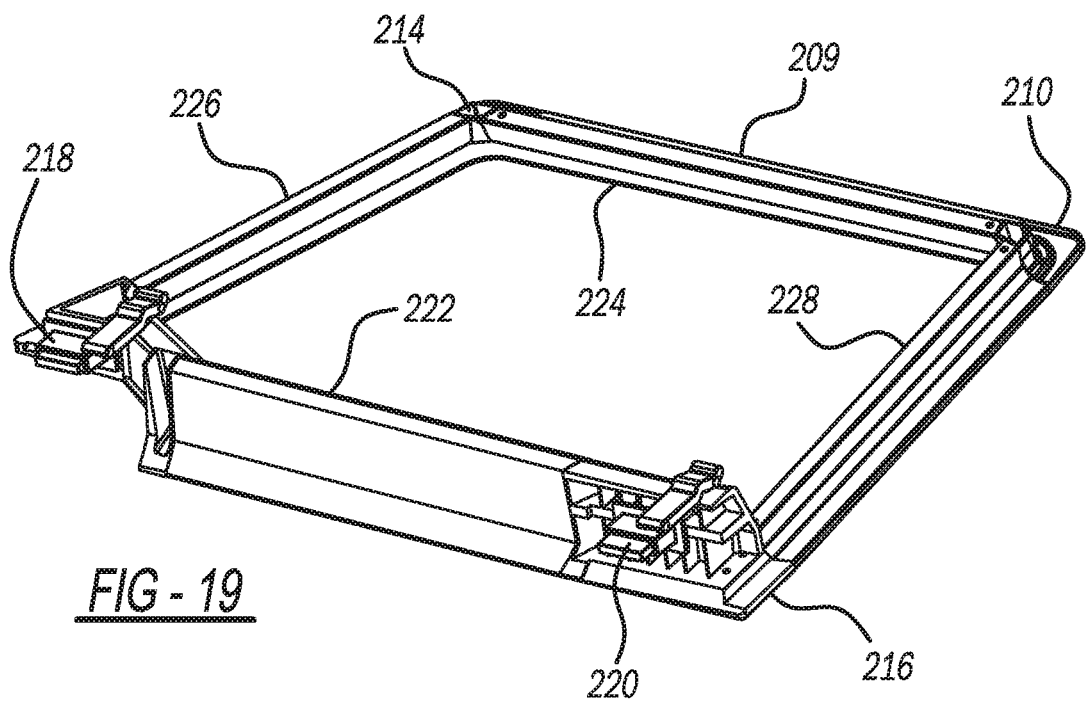
FIG. 19 is a perspective view of a window frame of FIG. 18 frame position on its side.
Figure 20:
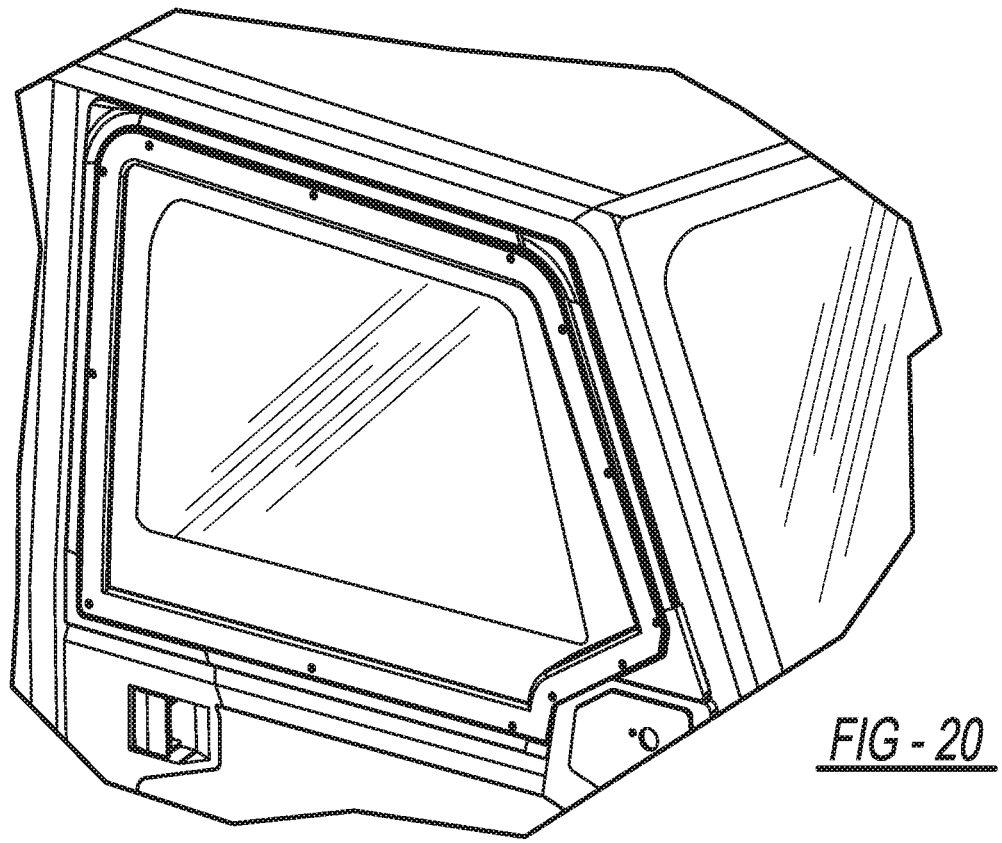
FIG. 20 is a perspective interior view illustrating the window frame of FIG. 18.
Figure 21:
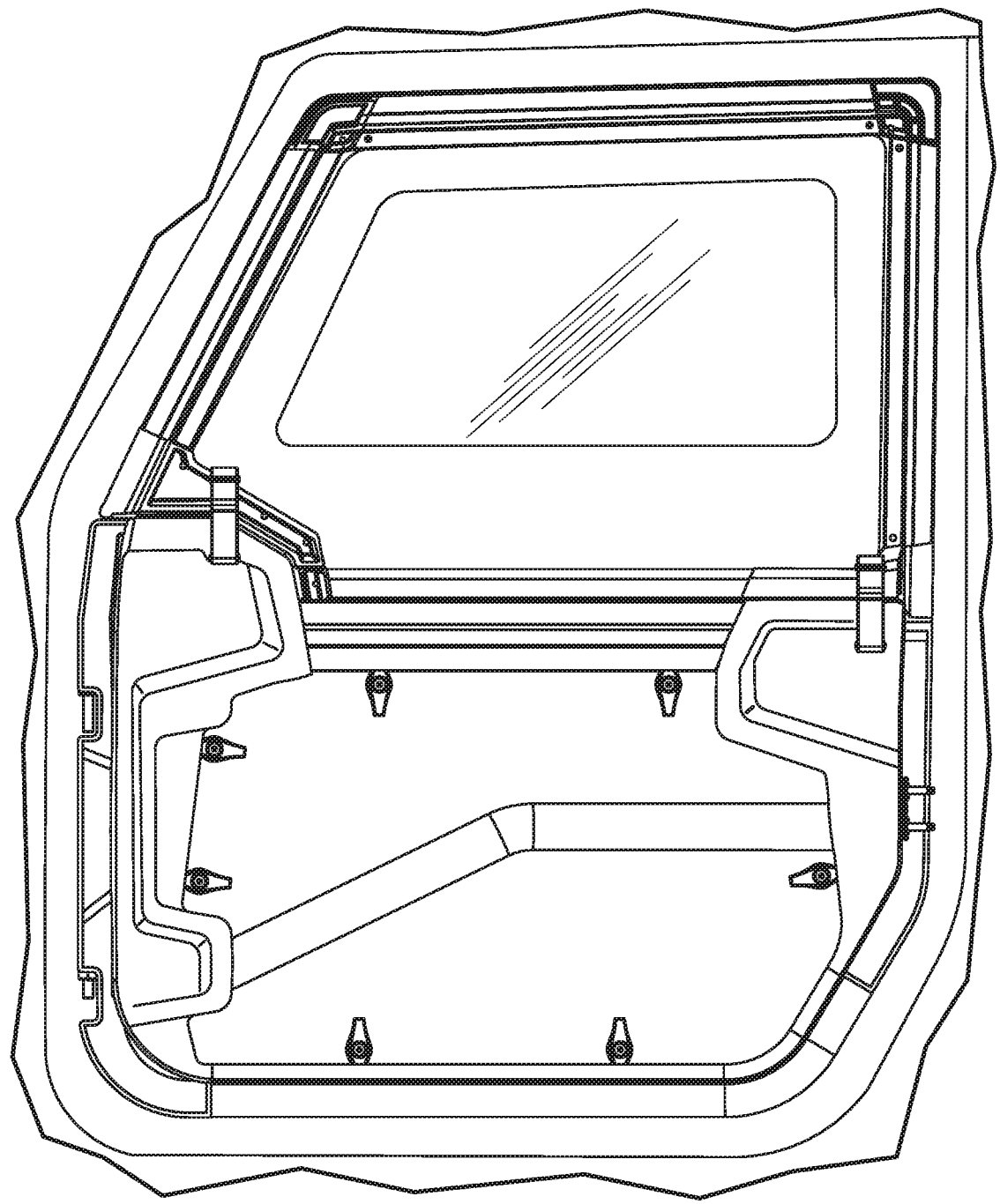
FIG. 21 is a side elevational view taken from the interior of the vehicle illustrating a door assembly with an installed outer panel.
Figure 22:
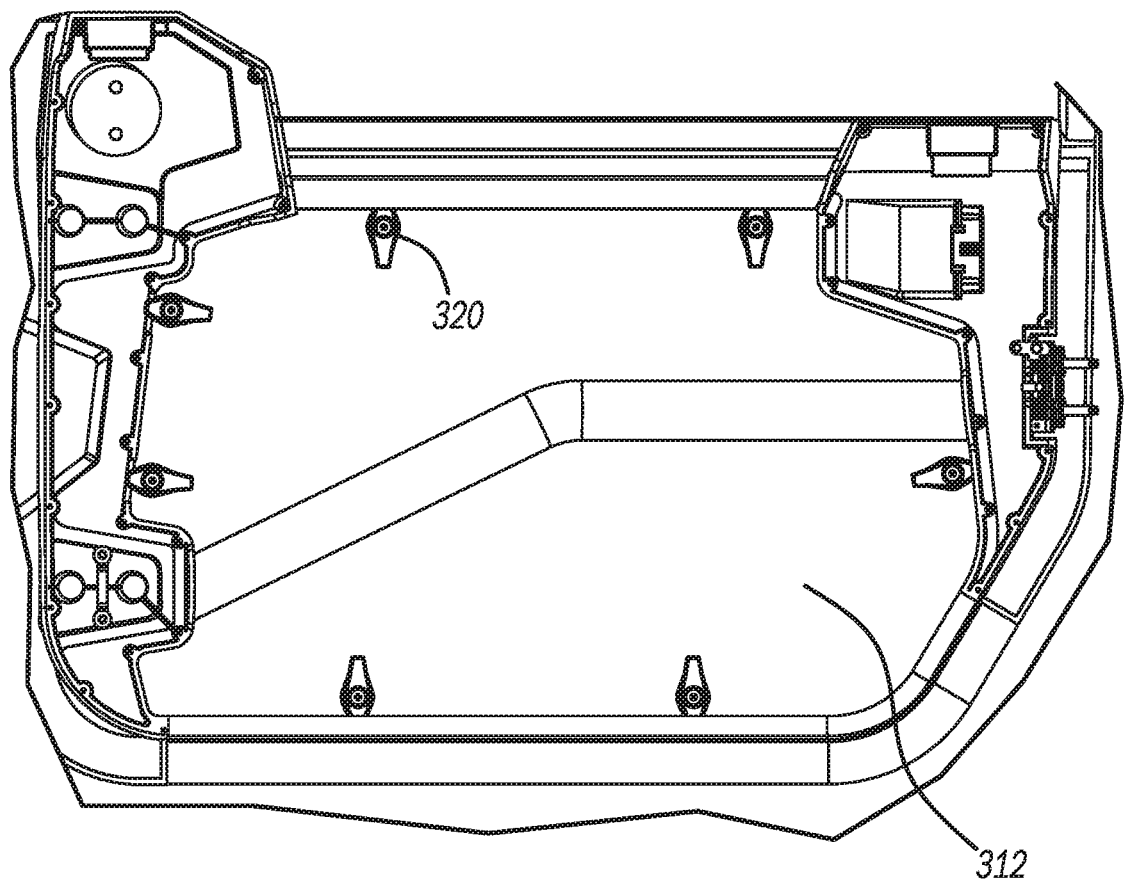
FIG. 22 is an enlarged view of the side door assembly shown in FIG. 21 with most of the window frame being removed for clarity of illustration.
Figure 23:
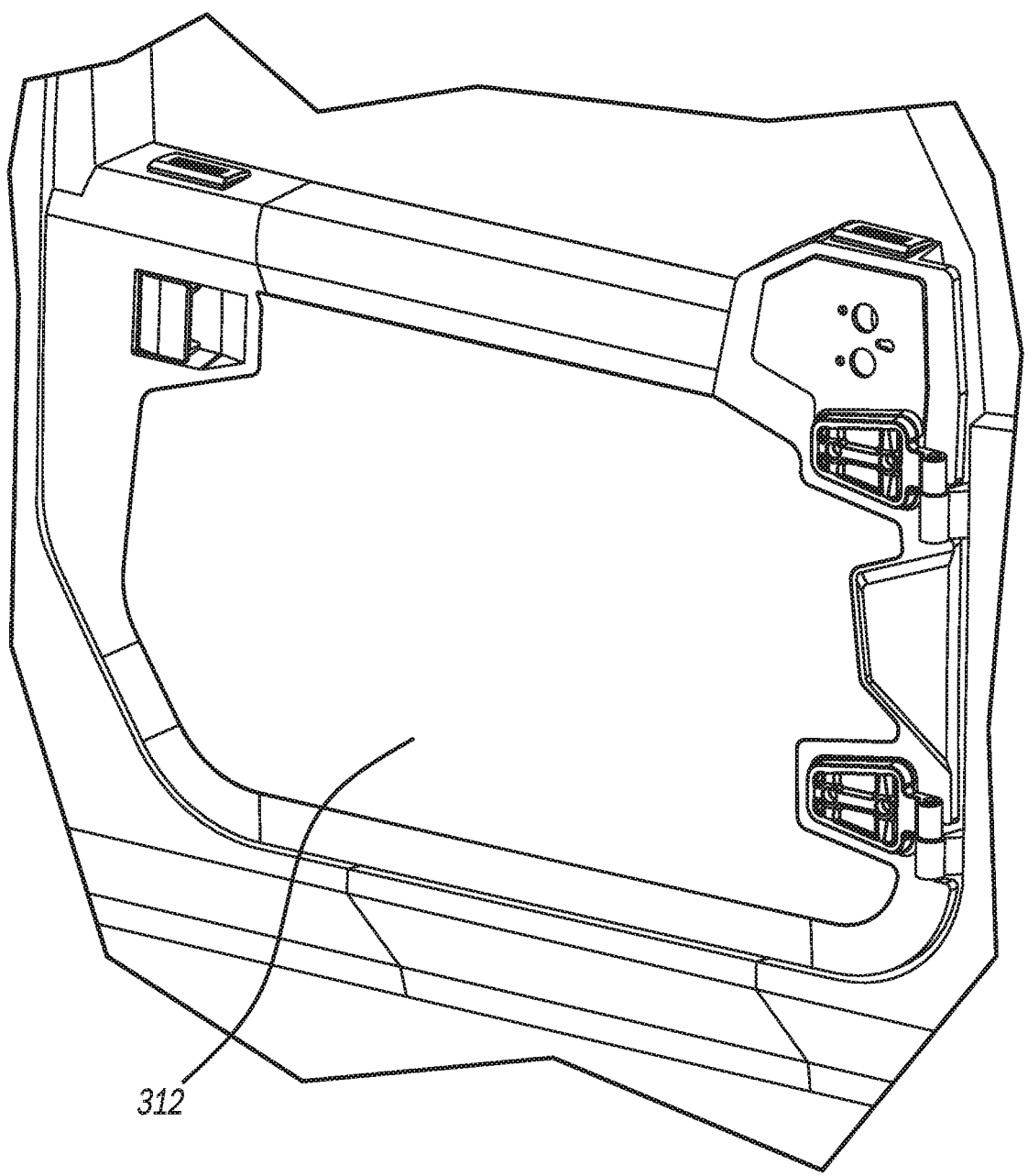
FIG. 23 is a perspective view of the door assembly shown in FIG. 22 from the outside of the vehicle.
Figure 24:
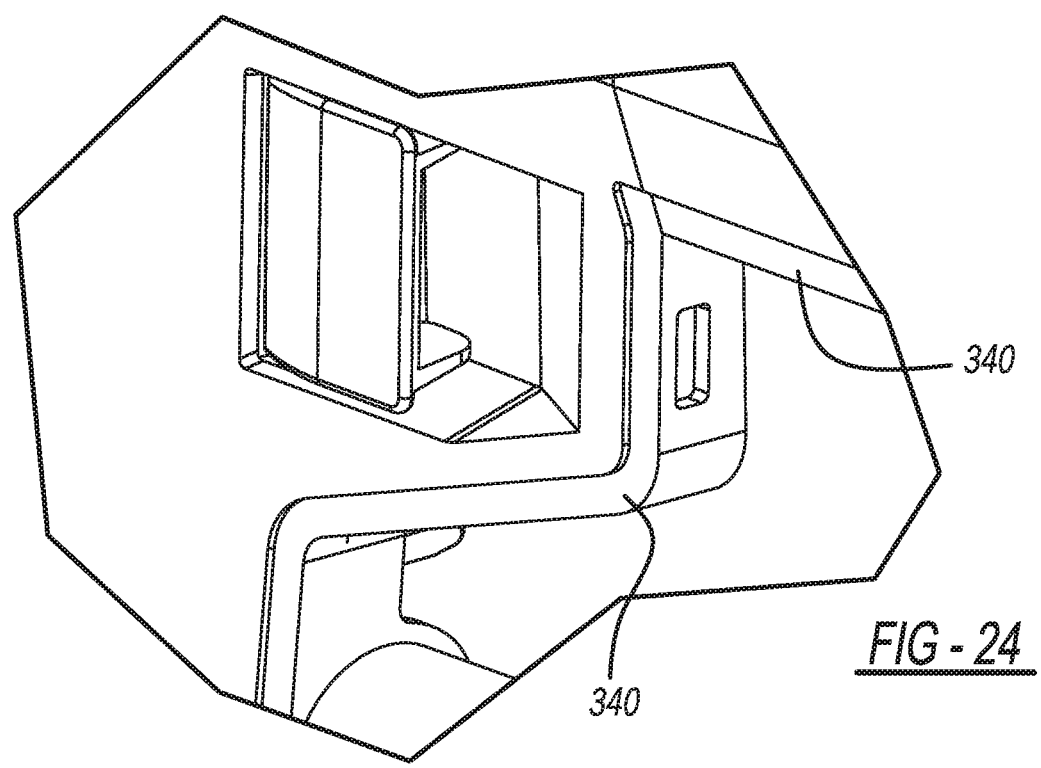
FIG. 24 is an enlarged perspective view illustrating a portion of a rear casting and extrusion having a recess for acceptance of an outer door panel of FIG. 23.
Figure 25:
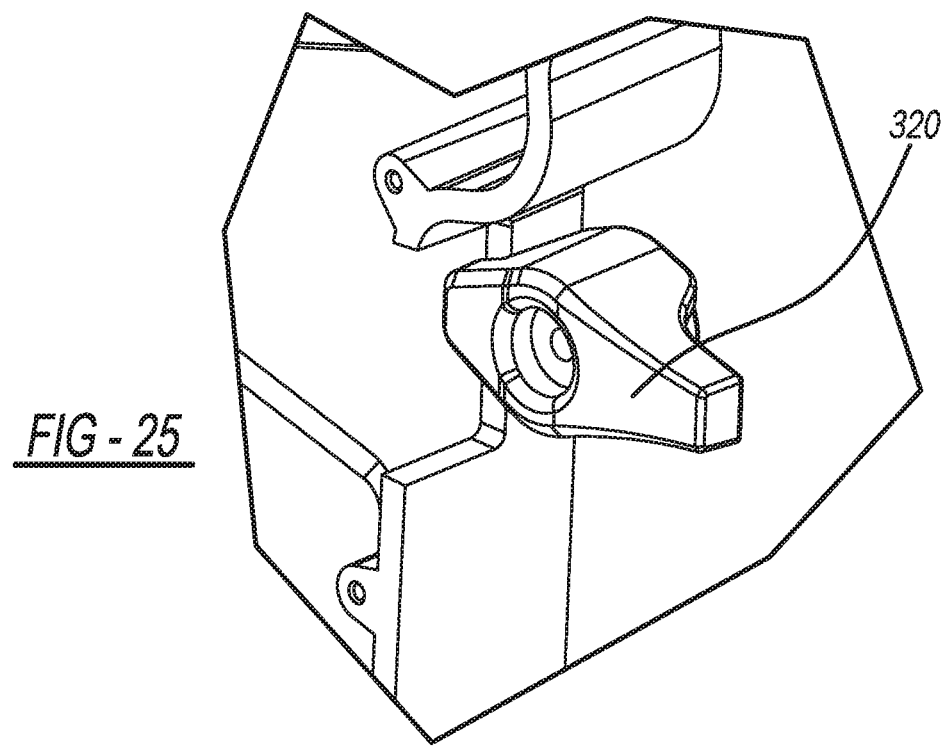
FIG. 25 is an enlarged perspective view illustrating cam toggles attached to the back side of an outer door panel shown in FIG. 20.
Figure 26:
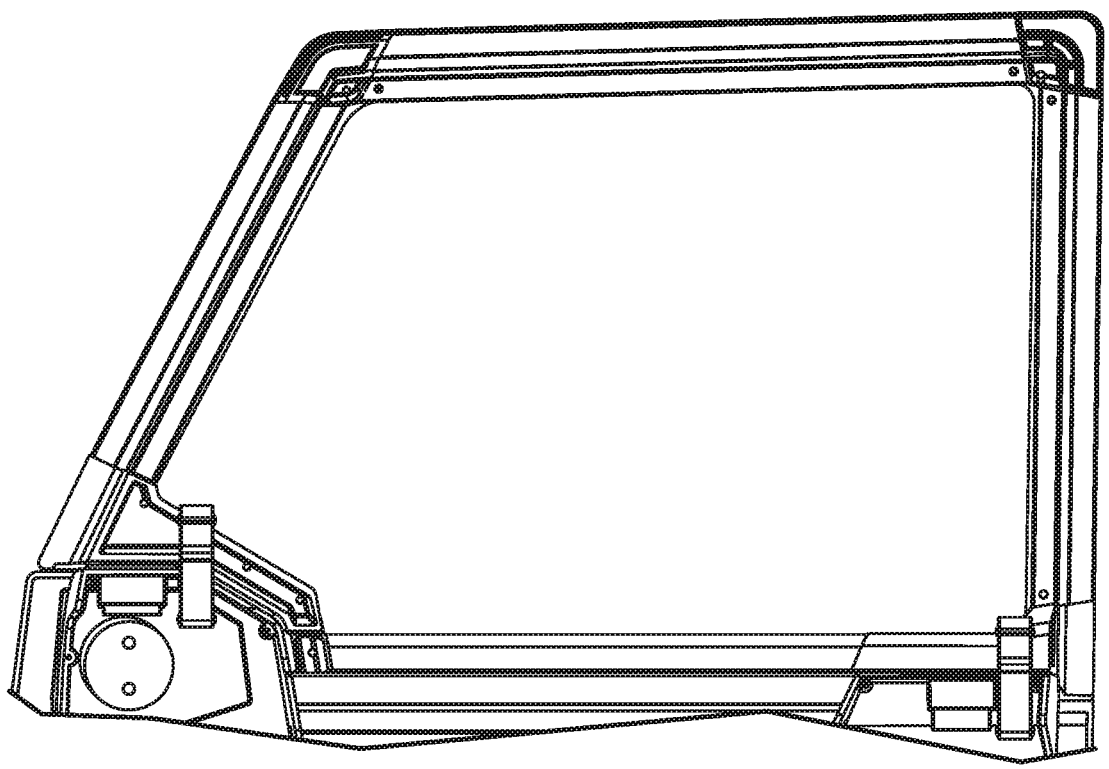
FIG. 26 is a view showing greater detail of the window frame utilized in the door assembly of FIG. 21.

Referring to FIG. 14, various attachment methods are illustrated. In FIG. 14 an extrusion 50 has an aperture 52 allowing it to be boltably connected to a casting 54 by a fastener with a front or rear end of the extrusion being placed within a pocket 56 provided in the casting with a matching fastener hole 58. Typically the fastener is connected from the inside to prevent it showing on the exterior of the vehicle. In FIG. 15 an extrusion 60 has a female opening fitted over a male stud 64 of a casting 66. In FIG. 16 an extrusion 68 is abuttingly connected with a casting 70 by bolts extending through extrusion 68 transverse to its longitudinal axis 72.

Figure 4:
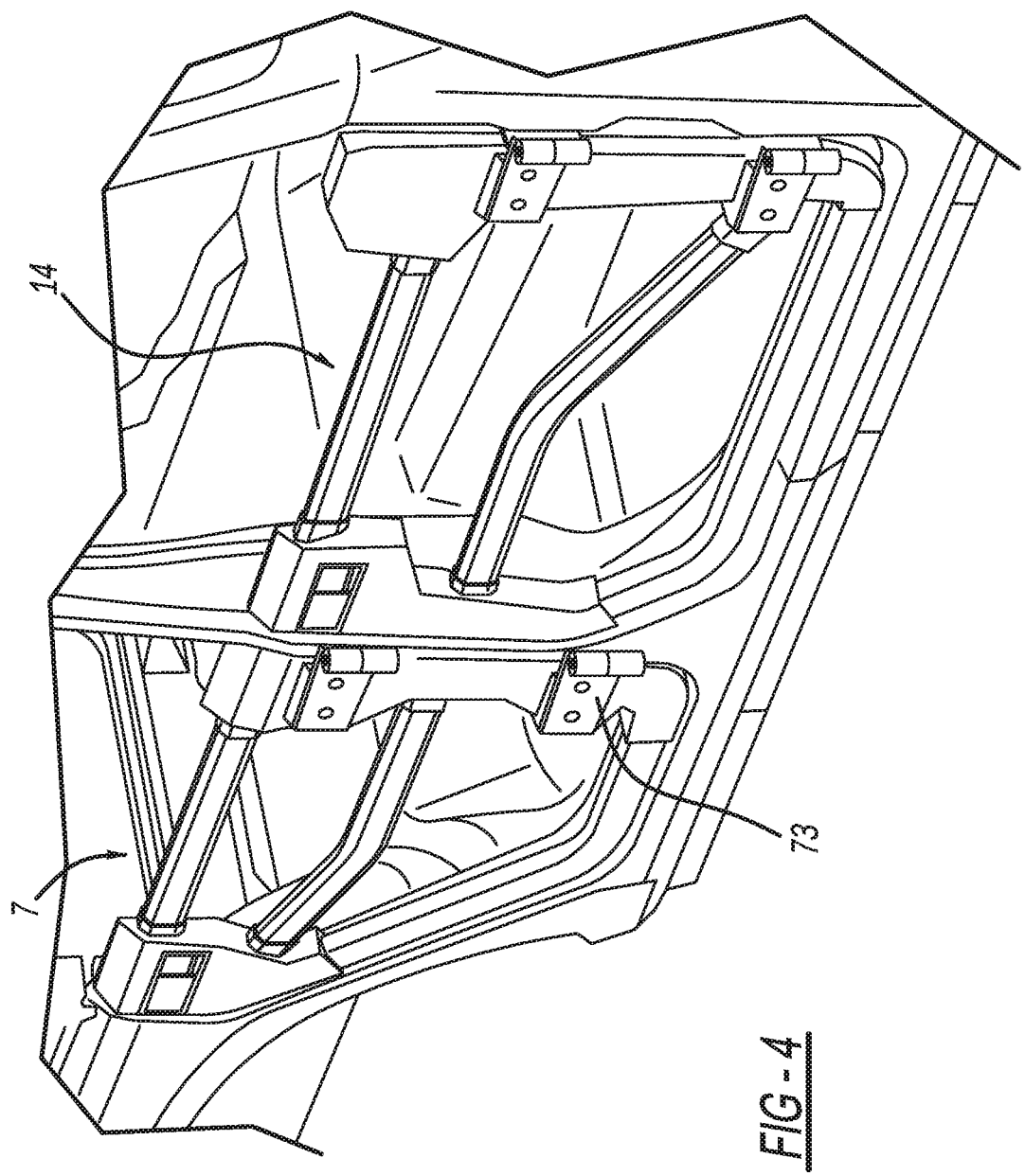
FIG. 4 is a perspective view of the door assembly shown in FIG. 1 with an alternative hinge pin arrangement.
Figure 5:
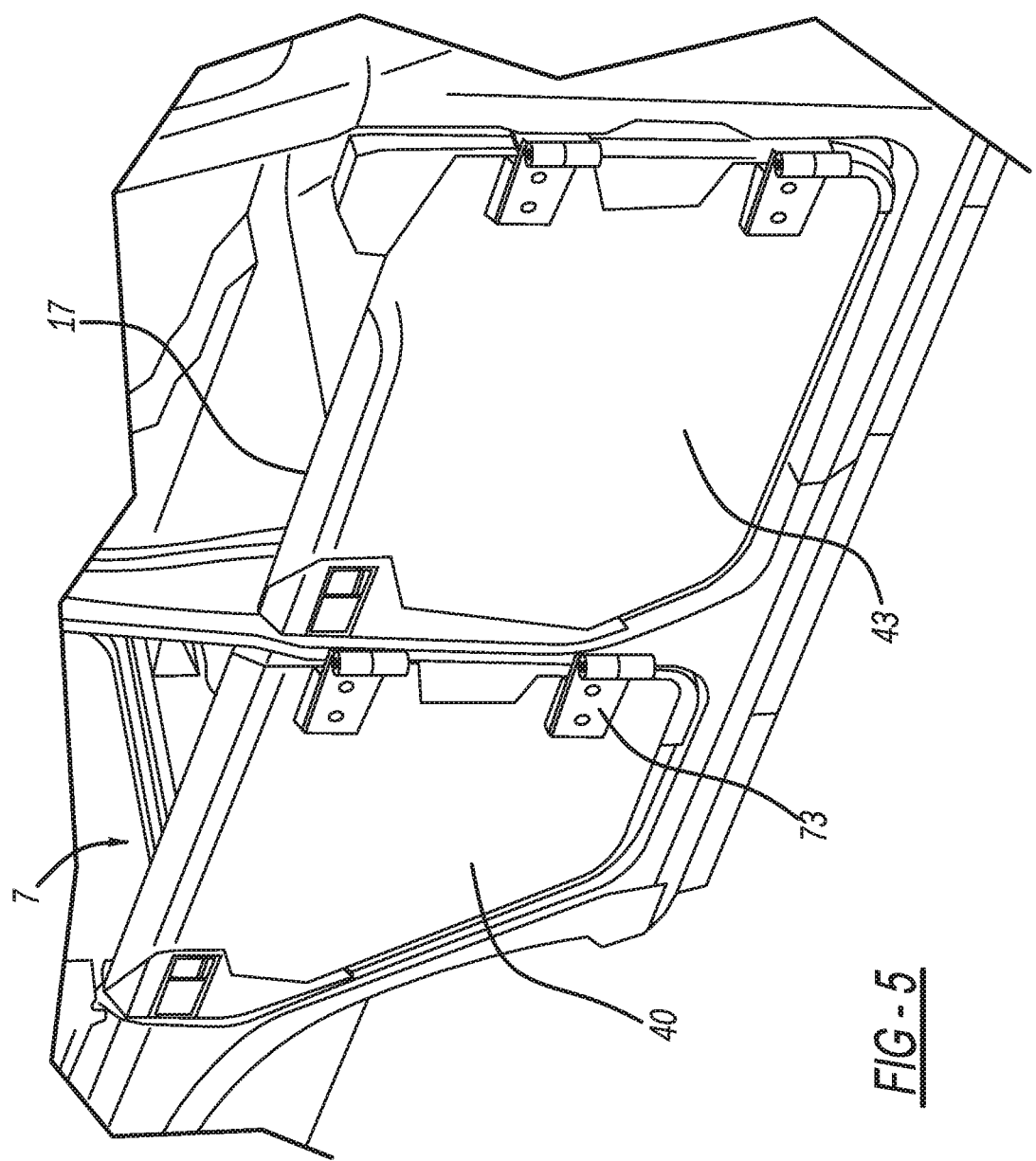
FIG. 5 is a view similar to that of FIG. 4, illustrating the side door assembly/assemblies shown in FIG. 4 having an additional door panel added thereon.

FIGS. 5 and 4 illustrate the door assemblies 7 and 17 with alternative hinge pin arrangement 73. The hinge pin arrangement 73 is typically utilized in external hinge pin arrangements. Additionally, in FIG. 5, the door assemblies 7 and 17 are shown with an exterior door panel 40 and 43.

Figure 6:
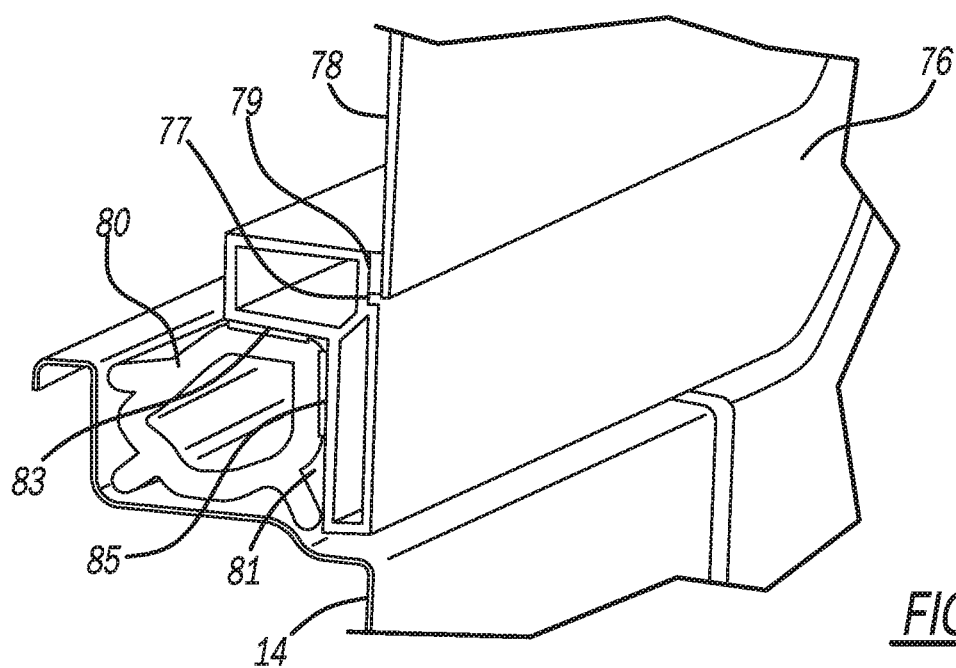
FIG. 6 is a perspective sectional view illustrating an inner seal utilized for sealing a lower portion of a door assembly according to the present invention.

FIG. 6 illustrates a bottom portion of a lower extrusion 76 having a recess 77 for acceptance of an outer panel 78. The panel 78 is partially sealed by a preform or applied sealant 79. The sealant and panel 78 are fitted in the recess 77. The extrusion 76 also has an open groove 81 having generally perpendicular wall 83 (as shown horizontally) and 85 (shown vertically) that adhesively connect a sealing bulb or weather strip 80 to seal a lower portion of the door opening.

Figure 7:
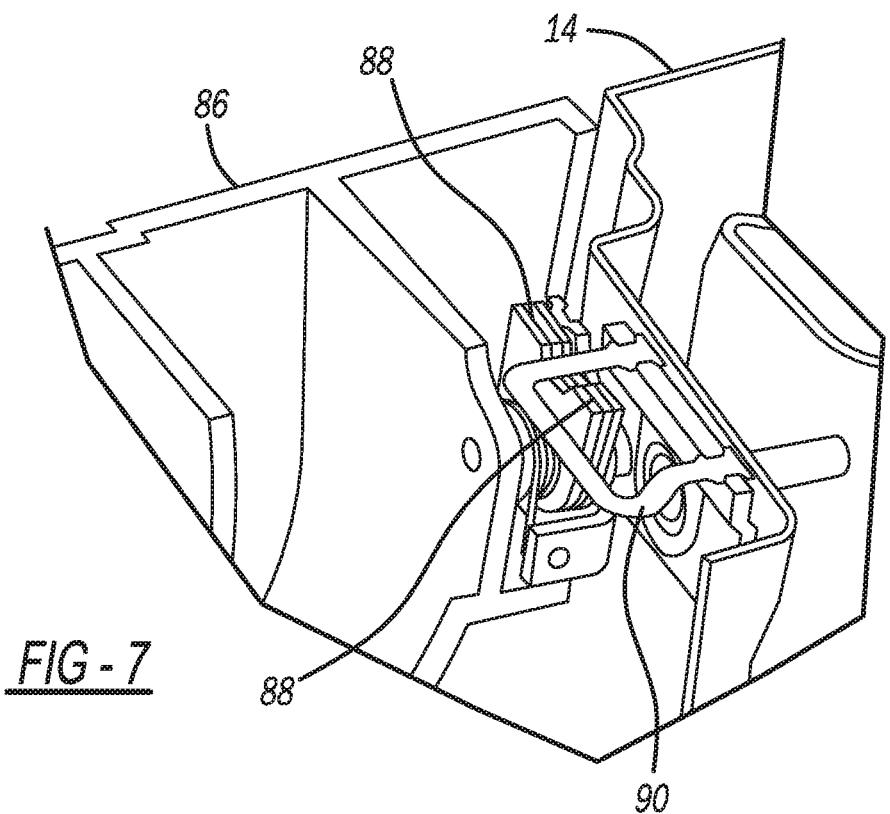
FIG. 7 is a perspective sectional view of a rear casting of a door assembly according to the present invention illustrating a latch for connection of the door assembly to the vehicle.

FIG. 7 illustrates a rear casting 86 mounting latched hardware 88 for engagement with a striker 90 connected with the vehicle body 14.

Figure 8:
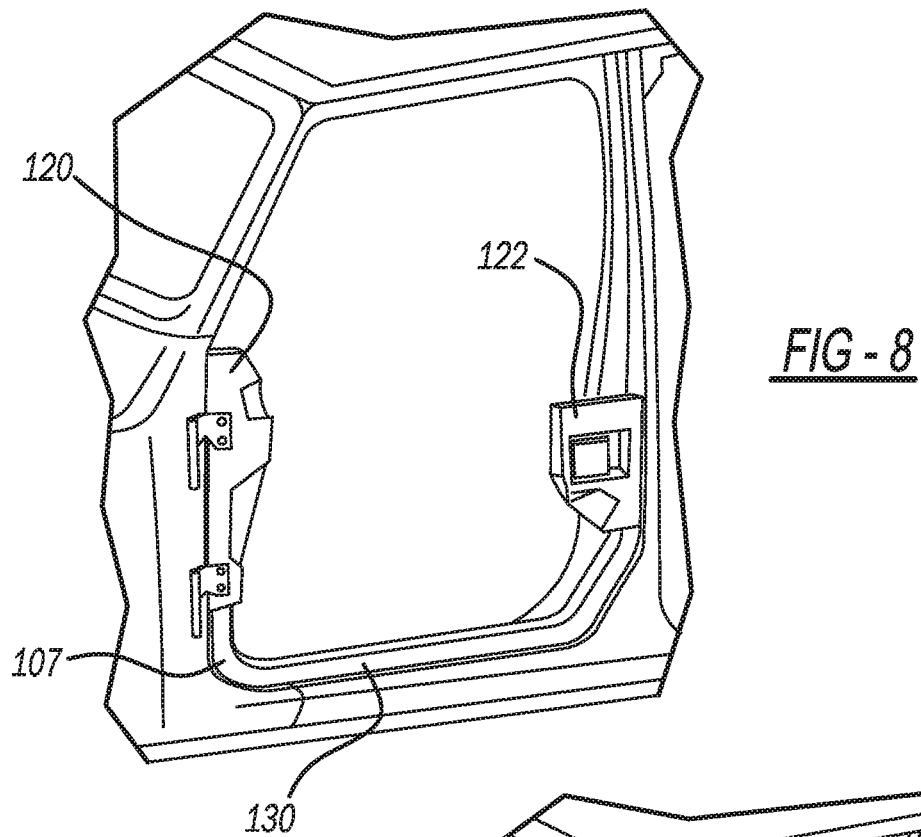
FIG. 8 is a door assembly according to the present invention, having a singular lower extrusion connecting front and rear castings.

FIG. 8 illustrates a door assembly 107 having a front casting 120 and a rear casting 122 joined only by a lower extrusion 130.

Figure 9:
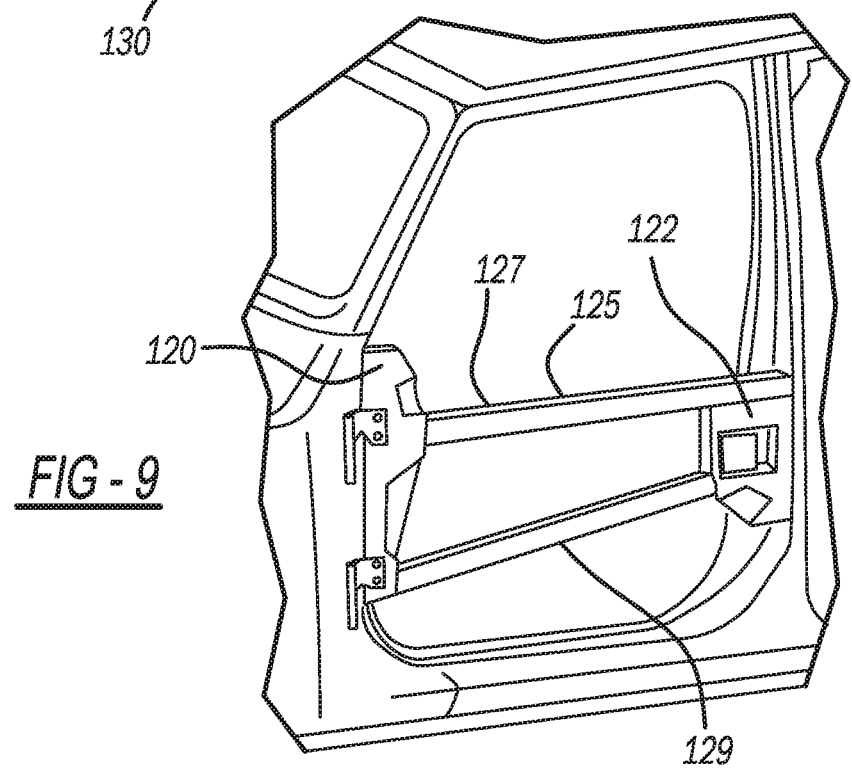
FIG. 9 is a perspective view of an alternate preferred embodiment side door assembly according to the present invention providing a quarter door.

FIG. 9 illustrates a door assembly 127 having a front casting 120 and a rear casting 122 connected by an upper extrusion 125 and a midpoint extrusion 129 forming a quarter door.

Figure 10A:
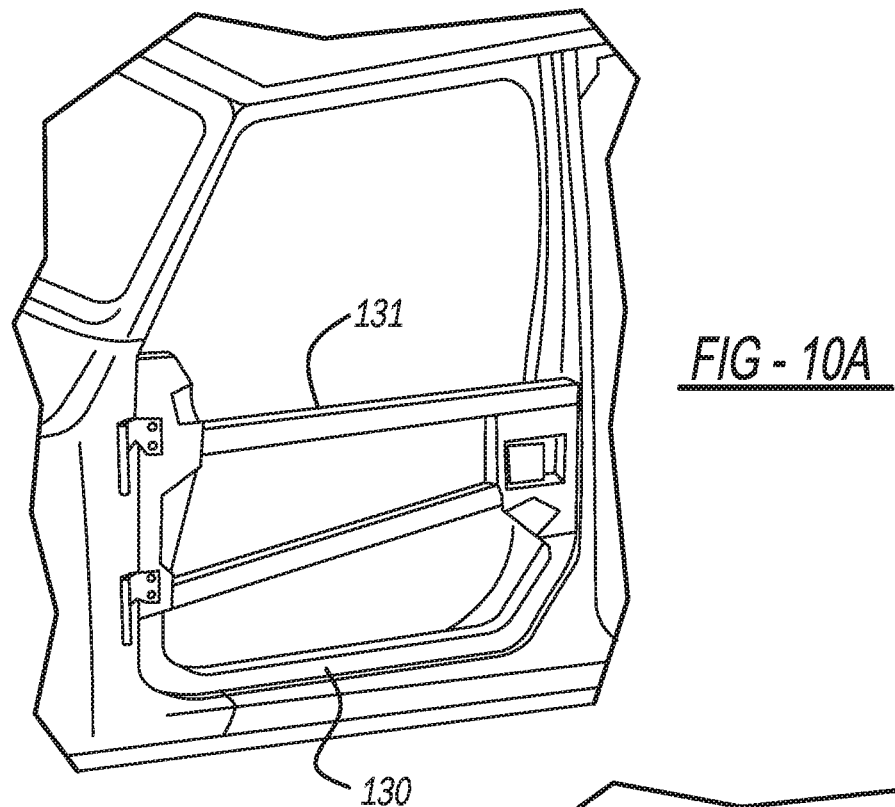
FIG. 10A is a view of the door assembly according to the present invention providing a half door.
Figure 10B:
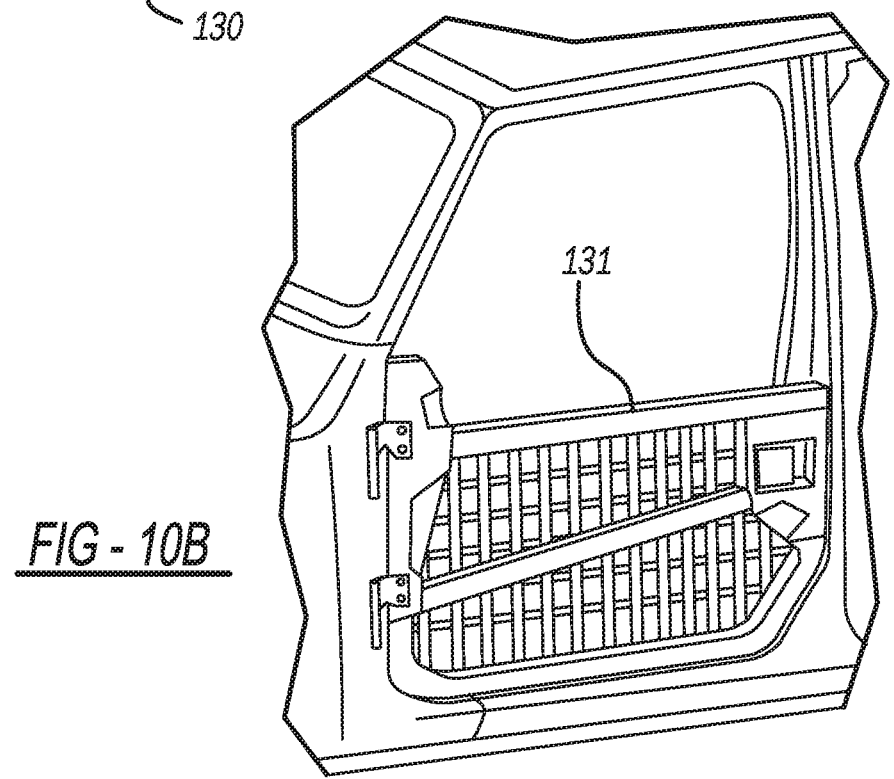
FIG. 10B is a perspective view of the door assembly according to the present invention providing a half door that is netted in a racecar manner.
Figure 13A:
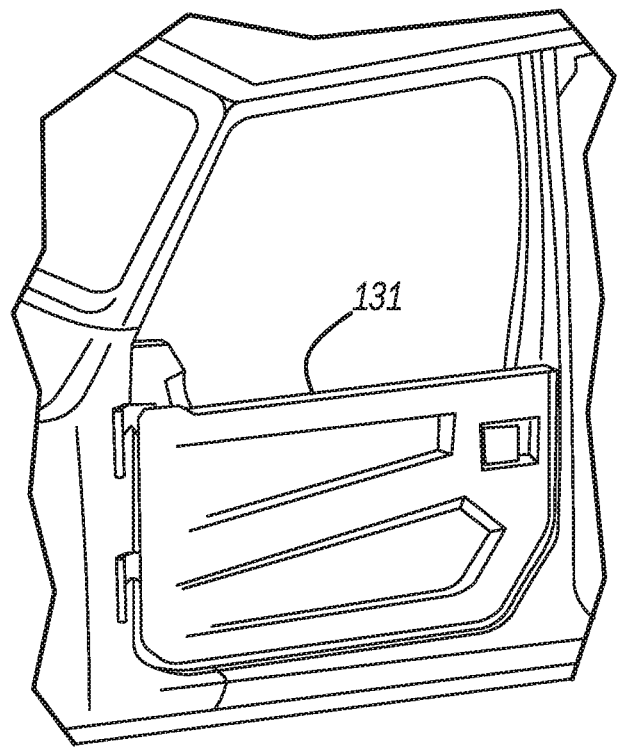
FIG. 13A is a door assembly similar to that previously described in FIG. 10A having an outer panel.
Figure 13B:
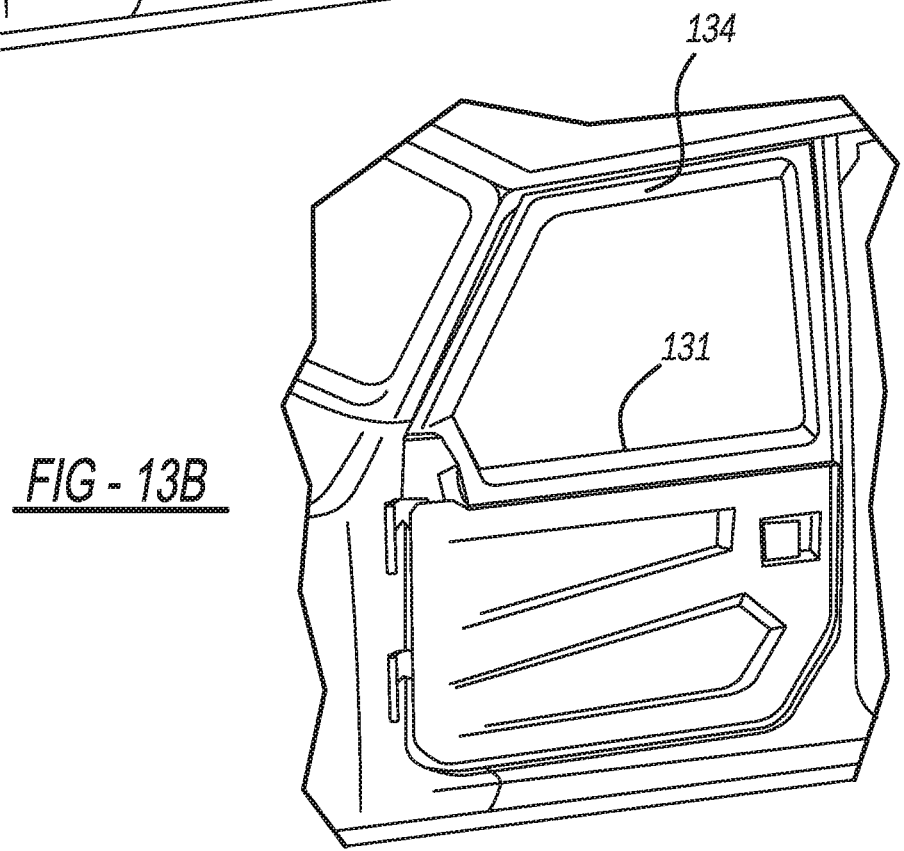
FIG. 13B is a door similar to that shown in FIG. 13A, additionally having a window frame providing a full door.

FIG. 10A illustrates door assembly 131, essentially identical to door assembly 172 with an addition of a lower extrusion 130A. The door assembly 131 is typically referred to as a half-door assembly. The half door in FIG. 10B illustrates the door 131A with the addition of a racing net. FIG. 13A illustrates the door assembly 131 with the addition of an outer door panel. Typically, the outer panel is an aluminum stamping, vacuum-formed plastic or durable fabric. Door assembly 131 in FIGS. 10A and 10B, and in 13A are commonly referred to as half doors. FIG. 13B is essentially identical to the door assembly 131, however 13A additionally has an added window frame 134 and is commonly referred to as a full door.

Figure 11:
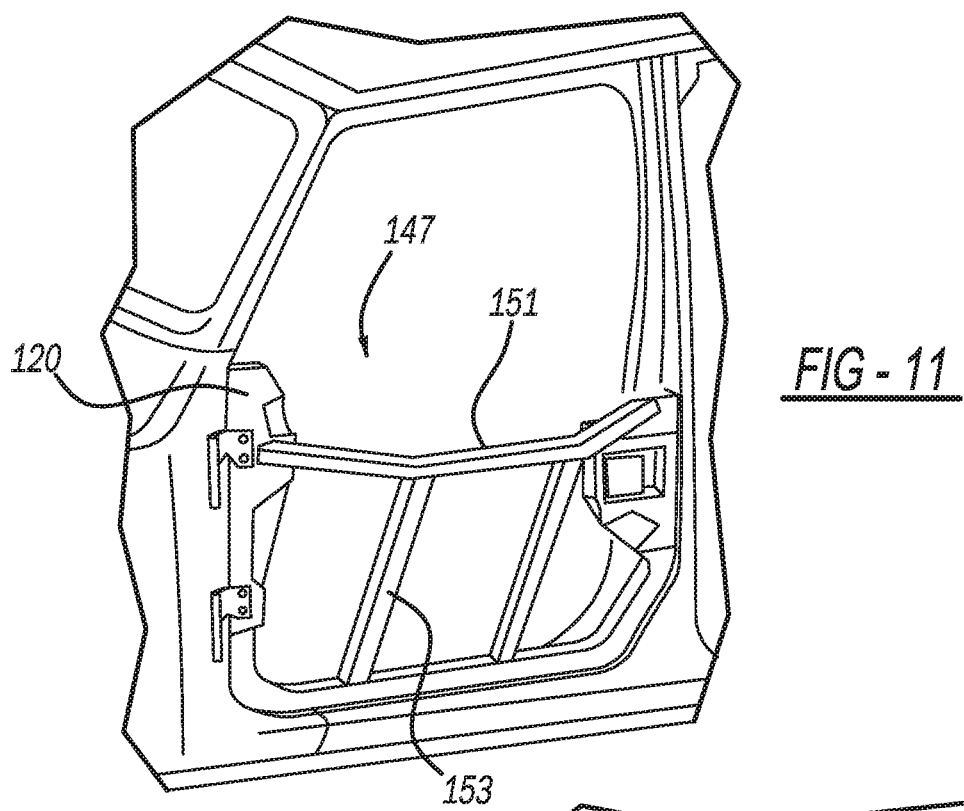
FIG. 11 is a perspective view of an alternate preferred embodiment door assembly according to the present invention wherein the door extends outwardly.
Figure 12:
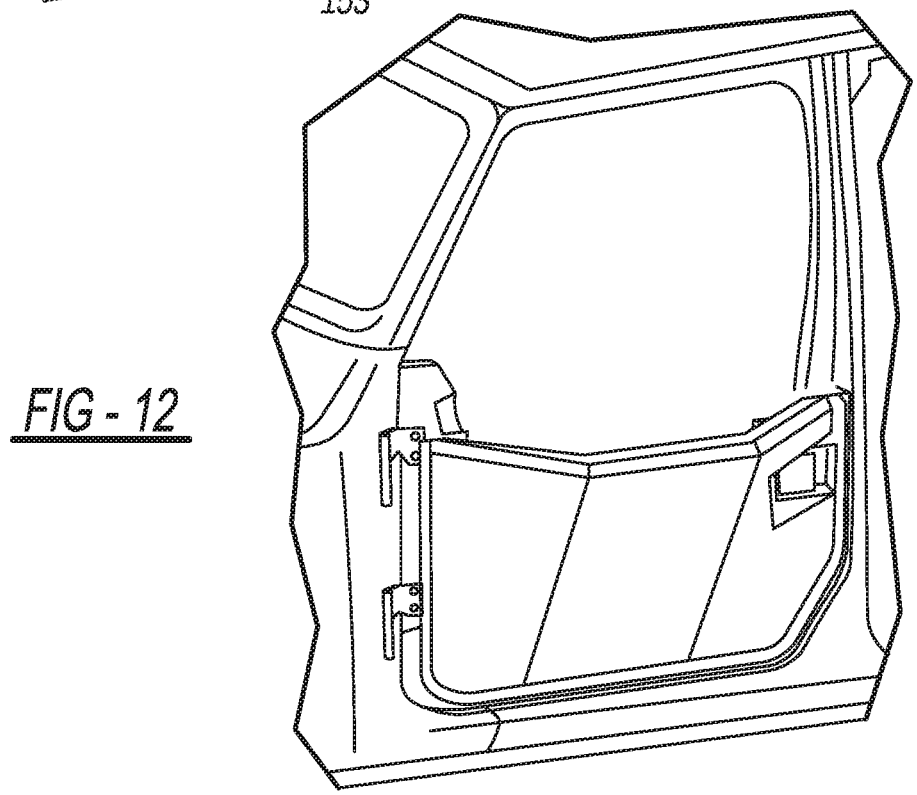
FIG. 12 is a door assembly similar to that shown in FIG. 11 having an outer door panel.

FIG. 11 provides a door assembly 147 of a half door with front and rear castings 120 and 122. Door assembly 147 has an upper extrusion 151 that is arcuately bent outboard extending away from the vehicle body. Extrusion 151 is joined by two generally vertically inclined extrusions 153 that connect with the lower extrusion 130. FIG. 12 illustrates the door assembly as shown in FIG. 11 covered with an outer panel of material similar to that as noted in the door assembly described in 13A and 13B.

Referring to FIGS. 17 through 21, a door assembly 207 is provided having a connected window frame 209. Window frame 209 is fabricated from an upper rear casting 210, an upper front casting 214, a lower rear casting 216 and a lower front casting 218. Typically the fabrication material will be the same as for the door casting as previously described. The lower rear casting 216 and the front door casting 218 both have mounting blades 220. The lower castings 216 and 218 are connected with a lower extrusion 222. Castings 214 and 210 are connected by an upper extrusion 224. Castings 214 and 218 are joined by an extrusion 226, and castings 210 and 216 are connected by an extrusion 228. The rear window frame casting blade 220 extends into an aperture 230 formed on a generally flat horizontal portion 232 of a rear casting 236 of the door assembly. The blade 220 juxtaposes elastomeric inserts 238 and 240. Typically the longitudinal length of the elastomeric inserts 238 and 240 will be slightly larger than that of blade 220. Insert 238 has a generally vertical portion 240 joining to a generally horizontal portion 242. Horizontal portion 242 has a generally inclined top surface 244. Opposite elastomeric insert 240 has a generally vertical portion 250 joining to a horizontal portion 252. Horizontal portion 252 has a generally horizontal surface 254 blending into arcuate declining surface 256 and a vertical surface 258. An elastomeric strap 260 I provided for pulling down the door frame to the remainder of the door assembly. A horizontal surface 262 of the window casting 216 abuts the flat portion 242 of the door casting 236. Window casting 216 has an arcuate curvilinear edge 264 having mating contact with a downward incline curvilinear edge portion 270 of the door assembly rear casting 236. The blade 220 of window front casting 218 also fits an aperture of a front casting 272 of the door assembly. However, it is at a higher elevation than the blade 220 of the rear window casting. The details of elastomeric inserts of the front lower casting 218 of the window are essentially identical to those previously described.

Figure 28:
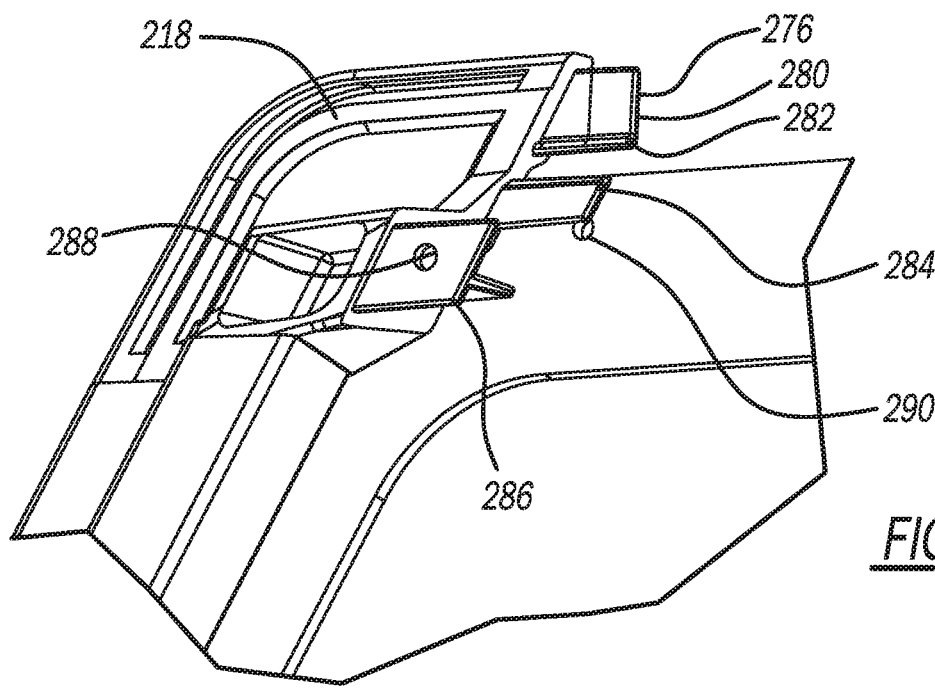
FIG. 28 is an exterior view perspective of an upper window frame casting of the window frame assembly shown in FIG. 26.
Figure 29:
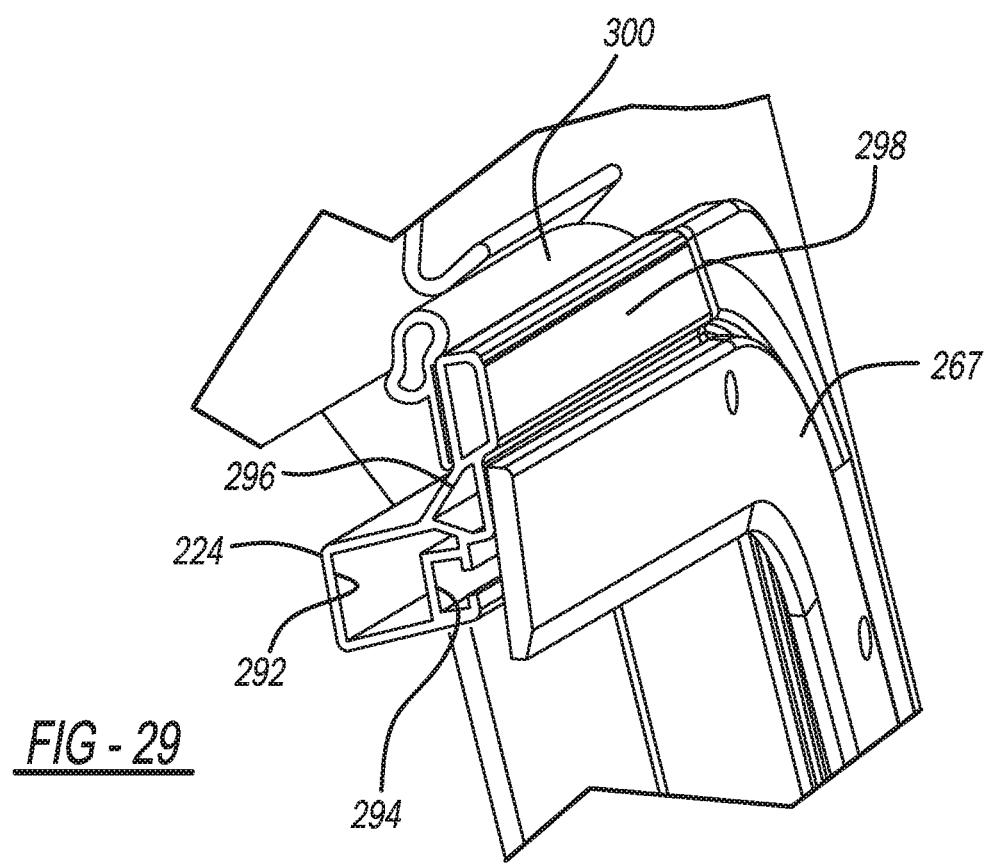
FIG. 29 is a sectioned view of the top extrusion frame shown in FIG. 27.
Figure 30:
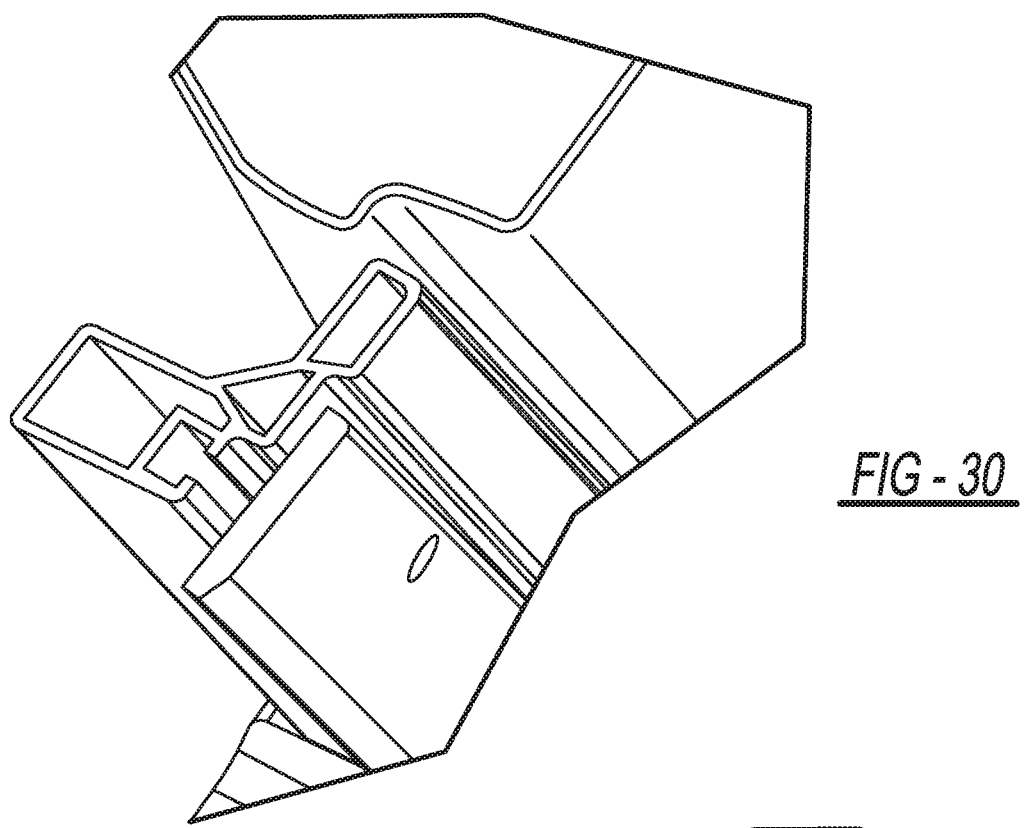
FIG. 30 is a sectioned view illustrating a portion of one of the upright extrusions of the door assembly of FIG. 27.
Figure 31:
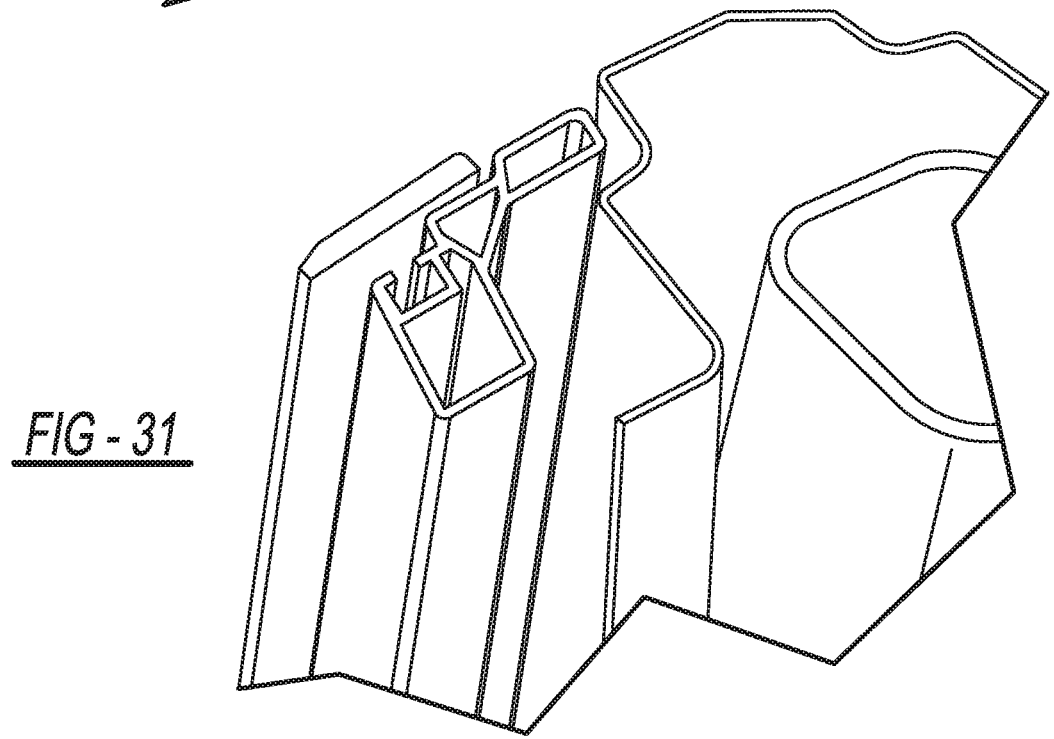
FIG. 31 is similar to that of FIG. 30 of the other upright extrusion of the window frame.
Figure 32:
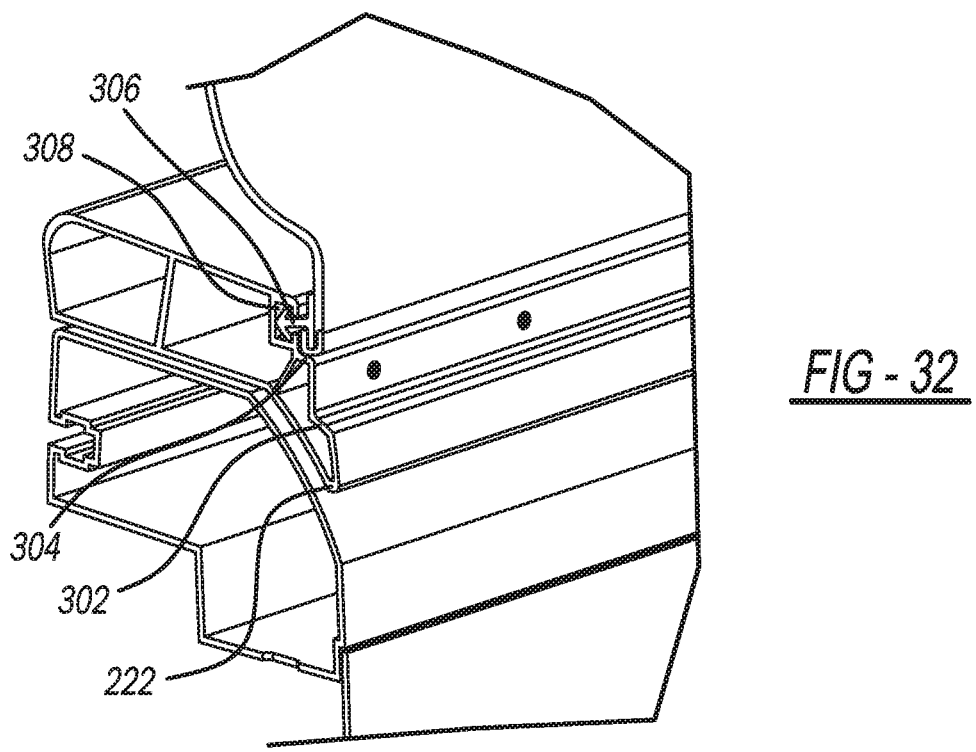
FIG. 32 is a section illustrating the soft goods attachment method of the window frame shown in FIG. 27.
Figure 33:
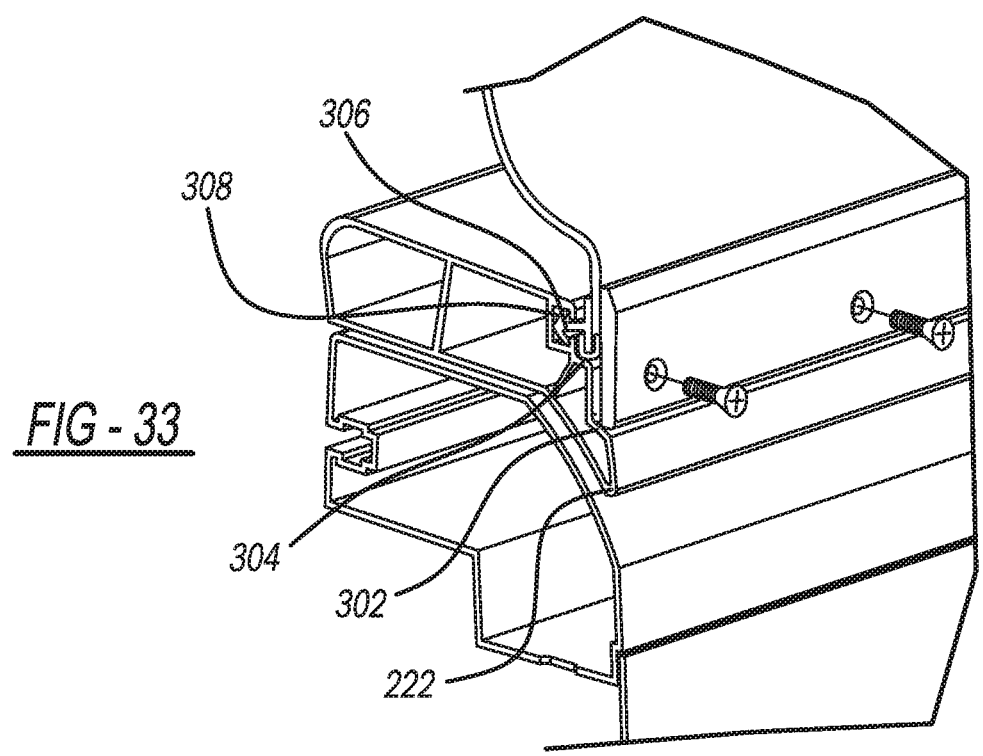
FIG. 33 is an exploded view similar to that of FIG. 32 illustrating the means of attachment of the frame piece to the lower extrusion of the window frame of the door assembly according to the present inventions.

FIGS. 28 through 33 illustrate further detail of the window frame 209. Referring in particular to FIG. 28, window casting 214 has a first male member 276, including a main male member 280 and a stud male member 282. A second male member 284 is also provided and a T-shaped cross sectional third male member 286 is also provided. Male member 286 has an aperture 288 to allow for connection of extrusion 224 to the casting 214 trim piece (sometimes referred to as a trim ring), which has an aperture 290 to allow for its bolted connection to the extrusion 224. The extrusion 224 has a channel 292 for reception of the male member 286 and the corresponding male member of window frame casting 210. Extrusion 224 also has a channel 294 for acceptance of an arrowhead extrusion utilized in maintaining the soft goods attachment of a twill carrier. Extrusion 224 has another channel 296, generally triangular in shape, for reception of male member 284 and for providing a surface for connection of the trim piece 267. Extrusion 224 also has a fourth channel 298. Channel 298 accepts male member 276 and supports a sealing bulb 300 that compressively loads and seals the window frame of the vehicle door opening. Seal 330 is typically adhesively connected with the channel 298.

The method of soft goods attachment is for lower extrusion 222 to have a first step 302 for support of the trim piece 267 and a higher step 304 supporting an arrowhead-type extrusion 306, which is sewn to a trill carrier arrowhead extension 306, fitted within a channel 308 similar to the channel 294 previously described.

Referring additionally to FIGS. 22 through 25, door assembly 207 is provided with an outer panel 312. Outer panel 312 is connected to front and rear door castings by a series of toggle switches 320. Toggle switches also connect the outer panel 312 to upper and lower extrusions. The extrusions and the front and rear castings have a recess 340 allowing the door panel to have a seamless look.

The door assembly 207 has a series of door hinges 350 that are symmetrical and can be used in the front and rear inside and outside, or left and right side of a vehicle utilizing the same.

Figure 36:
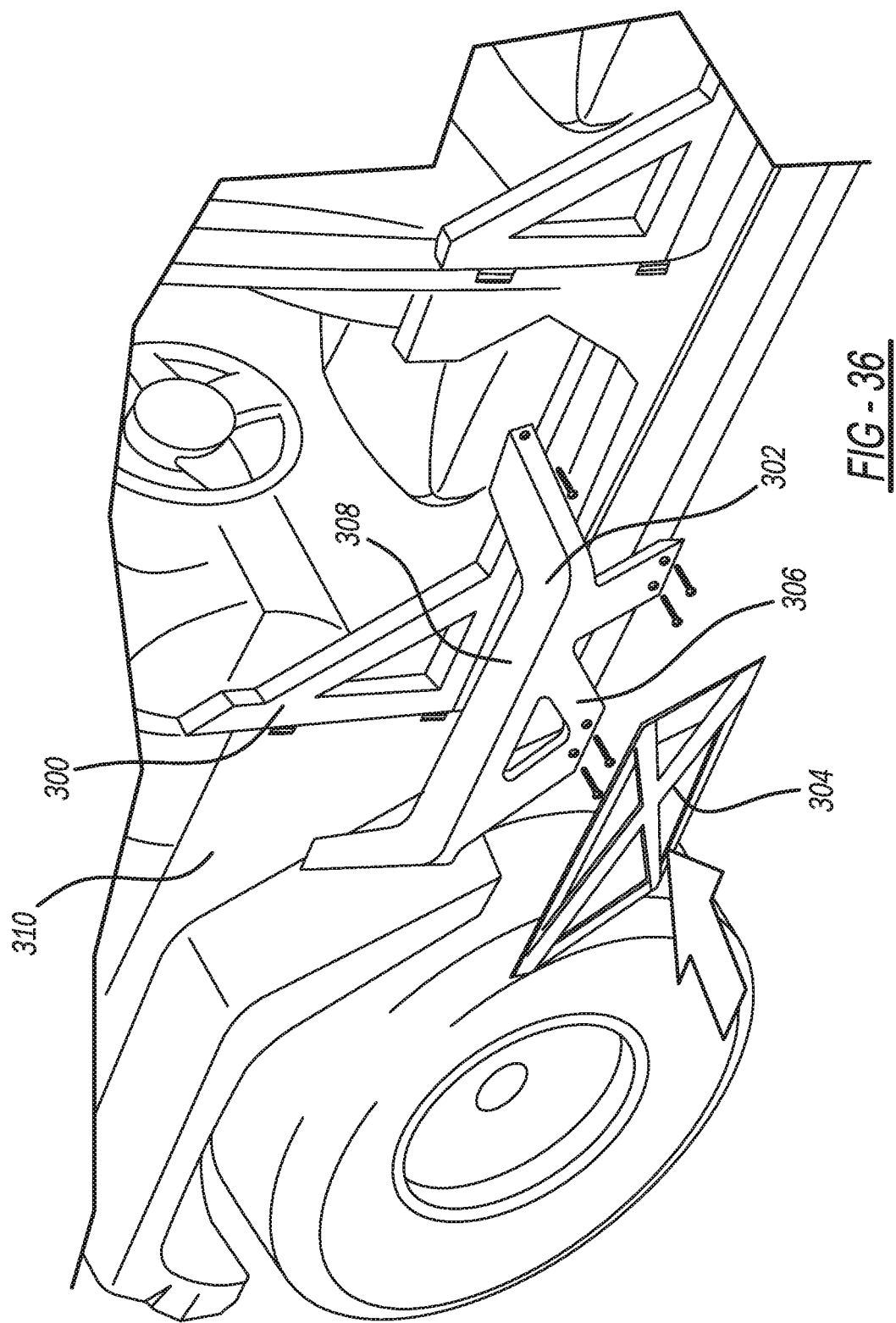
FIG. 36 is a perspective view of a bump-out door assembly of the present invention.
Figure 37:
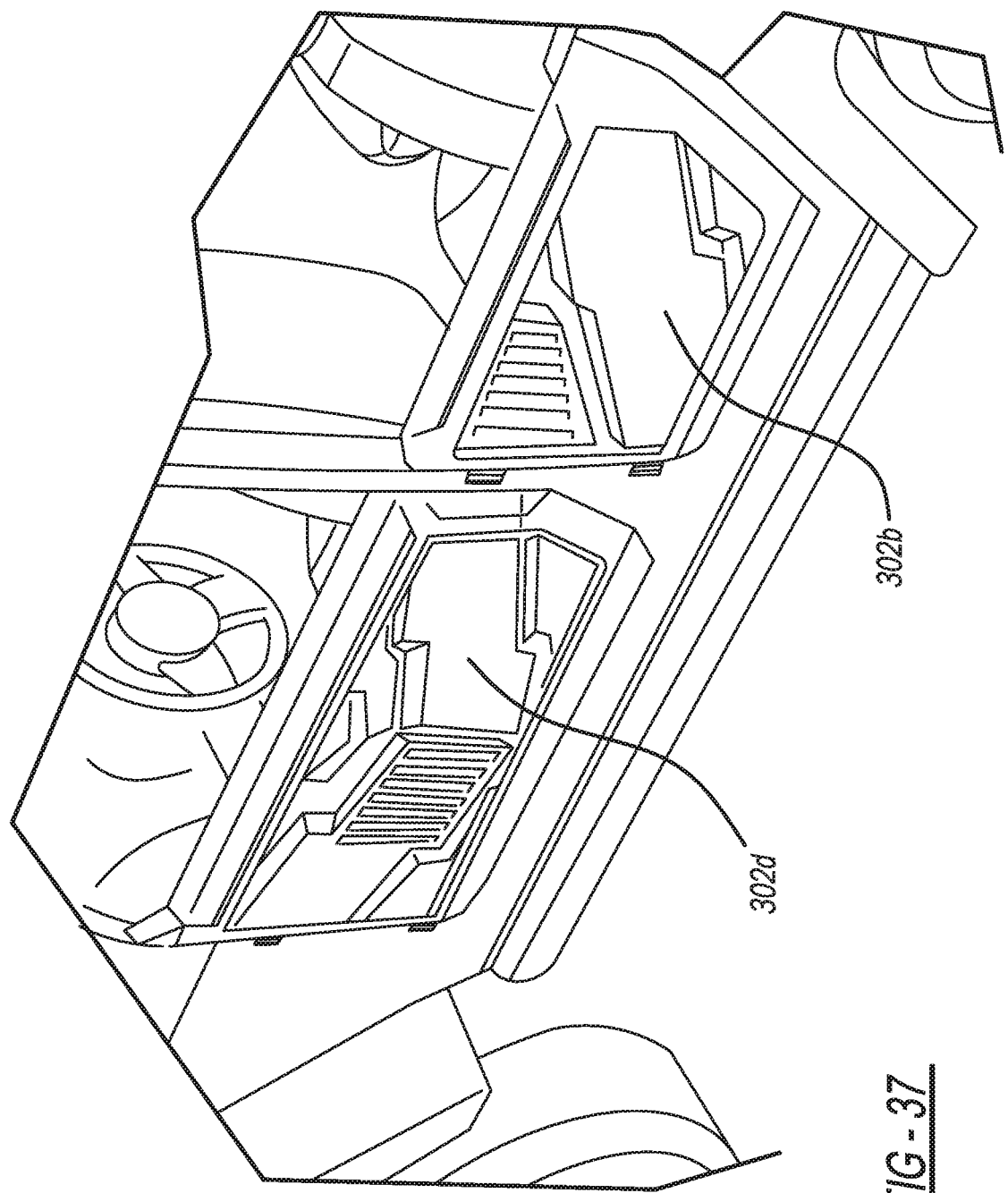
FIG. 37 is a perspective view of an alternate embodiment of a bump-out door assembly of the present invention.
Figure 38:
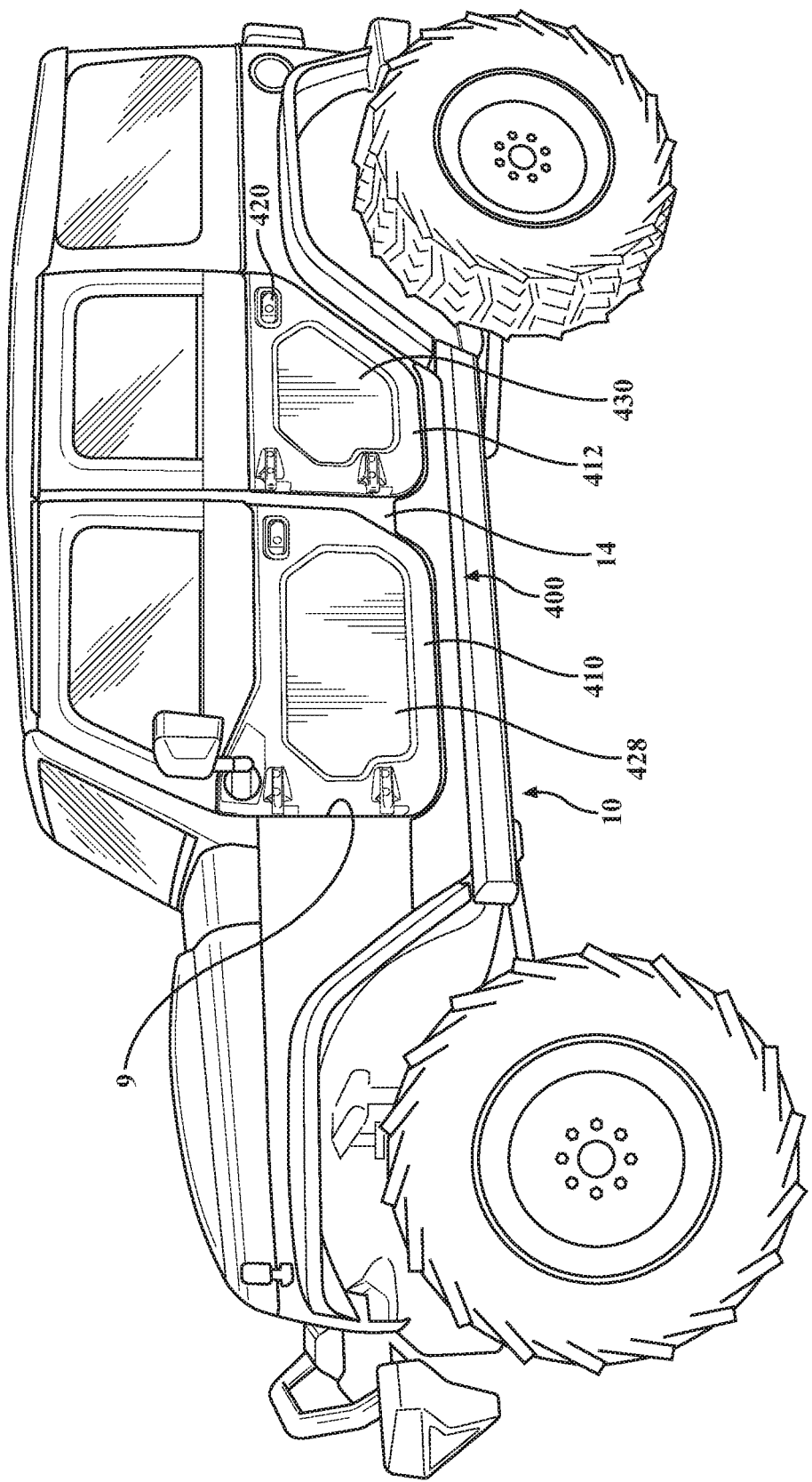
FIG. 38 is a perspective view of a side door assembly taken from the outside of the vehicle shown installed in a sport utility vehicle, in accordance with the present invention.

Referring now to FIGS. 36 and 37, there is shown a half door assembly which includes a portion 302 that extends outward from the door framework 300 of a vehicle. As shown in these figures a door frame portion 300 is hingedly attached to the vehicle 310. The door framework portion substantially fits within the door opening of the vehicle and substantially matches the planar vertical and horizontal planar surfaces of the vehicle 310. The side structure 302 extend outwardly form the vehicle to form a three dimensional shape which extends outwardly from the planar surface of the vehicle 310.

As shown in FIG. 36 the structure 302 can be bolted or welded to the framework 300 of the door. A panel such as 304 can be bolted to the framework or otherwise attached such as by welding if desired. Panels 302a and 302b also form a three-dimensional structure outside the planar surface of the vehicle and are attached either to the door framework or to the portion 302 depending on the desired final construction.

In the embodiment shown in FIG. 36 the bump out portion slopes outward from the bottom 306 to the top 308 as shown in the drawings.

Referring now to FIGS. 38-44 generally, there is provided a side door assembly shown generally at 400 according to the present invention. The side door assembly 400 is shown utilized to close a side door opening 9 in an automotive vehicle 10. The vehicle 10 shown is a Jeep™ automotive vehicle. Alternative sport utilities vehicles are contemplated without departure from the scope of the present invention. As shown, a front side door assembly 410 is for the front row passenger compartment, and a rear side door assembly 412 is for a rear passenger compartment. The side door assemblies 410,412 each have a one piece casting 414. The front 410 has a one-piece casting 414a, and the rear 412 has a one-piece casting 414b. The one-piece casting 414 is typically fabricated from die cast aluminum or titanium. Preferably, the casting includes a powder coated finish.

Preferably, the casting 414 is provided with upper and lower hinge pins 416a,416b to allow each door 410 and 412 to be pivotally connected to the vehicle body 14. Hinge pins 416a,416b operably connect the casting 414a of the front side door assembly 410 to the vehicle body 14, and a second pair of hinge pins 416a,416b connect the casting 414b of the rear side door assembly 410 to the vehicle body 14. Typically, the hinge pins 416a,416b are fabricate from stainless steel and are connected to the casting 414 by a press-fit or other suitable attachment method. Each door assembly 410, 412 is provided with a latch handle 418 and 420, respectively, which controls a latch mechanism, generally shown at 422 and 424, respectively, to allow the assembly to have a latched connection with vehicle body 14.

Most preferably, the side door assembly 400 has no additional castings. More preferably, the side door assembly 400 includes a one-piece casting and has no extrusion connecting front and rear castings.

A cable operated by latch handle can extend through an interior of the casting to operate a two-stage rotary latch with anti-rattle overmold, Preferably, the front latch handle is a TJ-style panel latch and is at the same elevation as rear latch handle for styling purposes.

Figure 42:
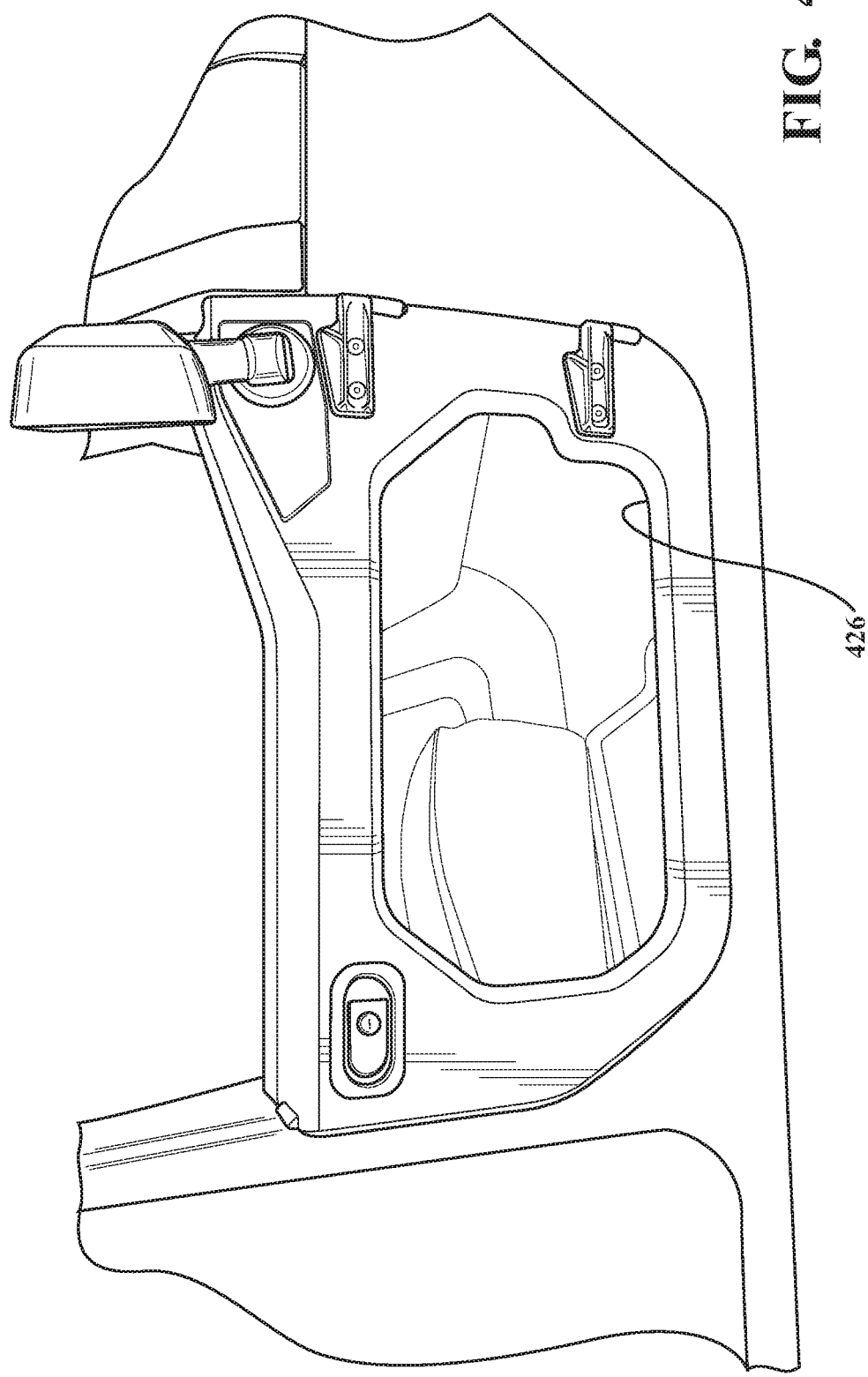
FIG. 42 is a perspective view of the front side door assembly of FIG. 38 taken from outside of the vehicle, shown installed in a sport utility vehicle, including an alternative embodiment with the panel removed, in accordance with the present invention.
Figure 43:
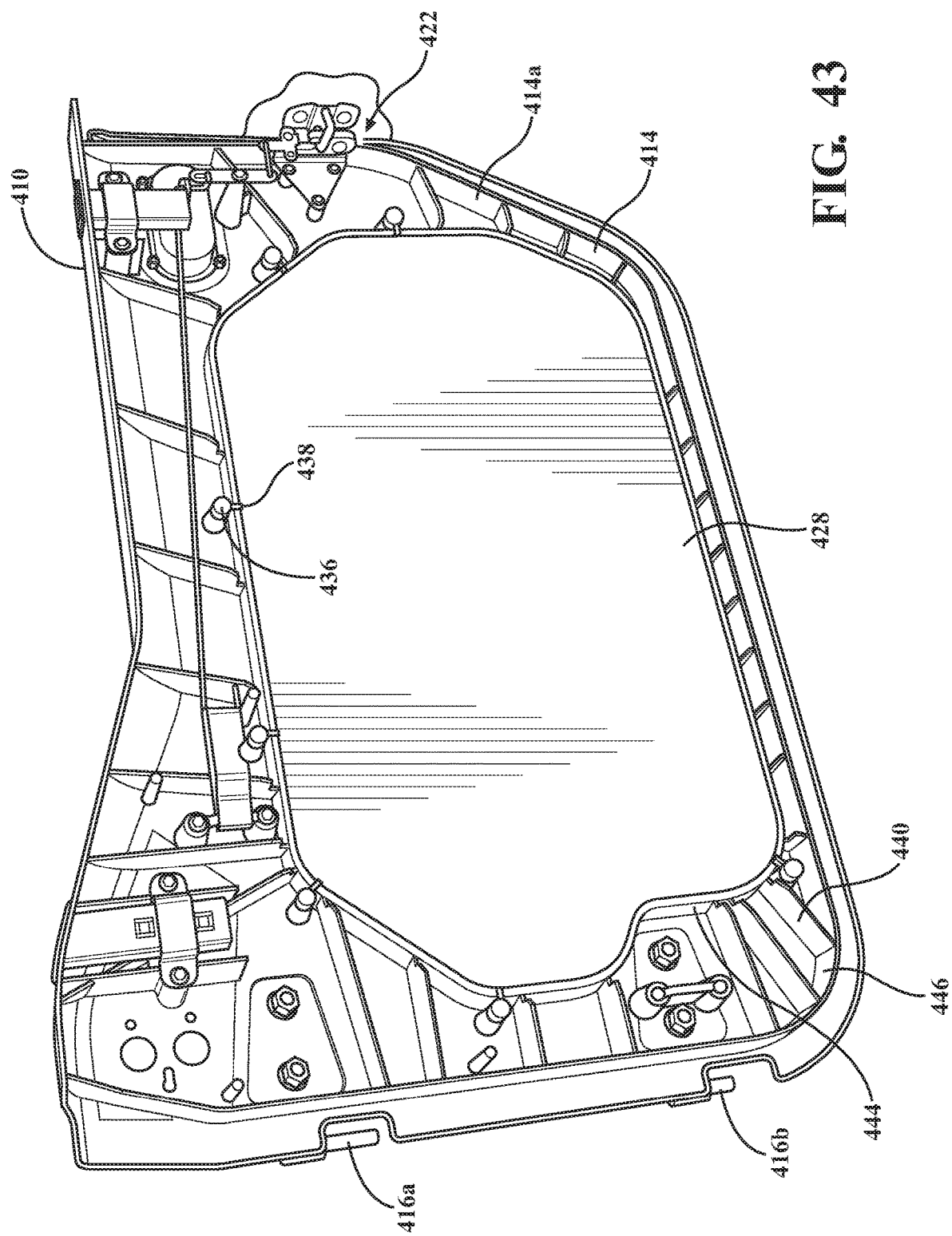
FIG. 43 is a rear perspective view of the front side door assembly of FIG. 38 taken from interior of the vehicle.
Figure 44:
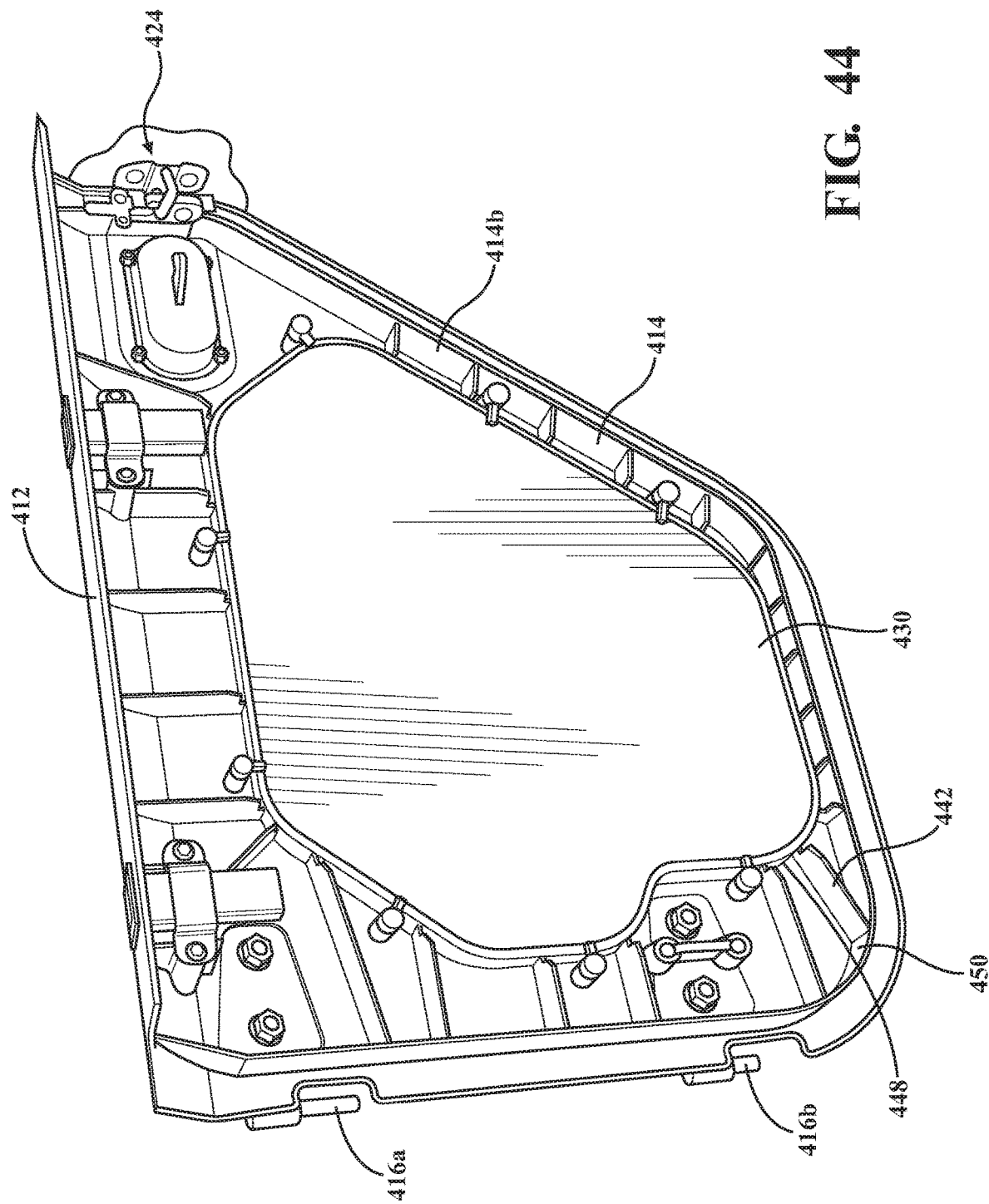
FIG. 44 is a rear perspective view of the rear side door assembly of FIG. 38 taken from interior of the vehicle.

The casting 414a is provided with an opening 426. FIG. 42 illustrates no cover or panel within, over or behind the opening 426. The vehicle interior is exposed through the opening. Optionally, a netting (FIG. 10B), bag, canvas bag, straps, webbing, or any other suitable add on feature can be added over the opening, most preferably, from the interior of the vehicle.

In FIGS. 38-40 and 43-44, the door assemblies 410 and 412 are shown with a door panel 428 and 430, respectively, preferably, an interior door panel. The door panel 428 and 430 is by way of non-limiting example fabric, plastic, etc. Preferably, the door panel 428 and 430 is not transparent and cannot be seen through. Most preferably, the door panels 428, 430 are molded plastic panels.

Figure 41:
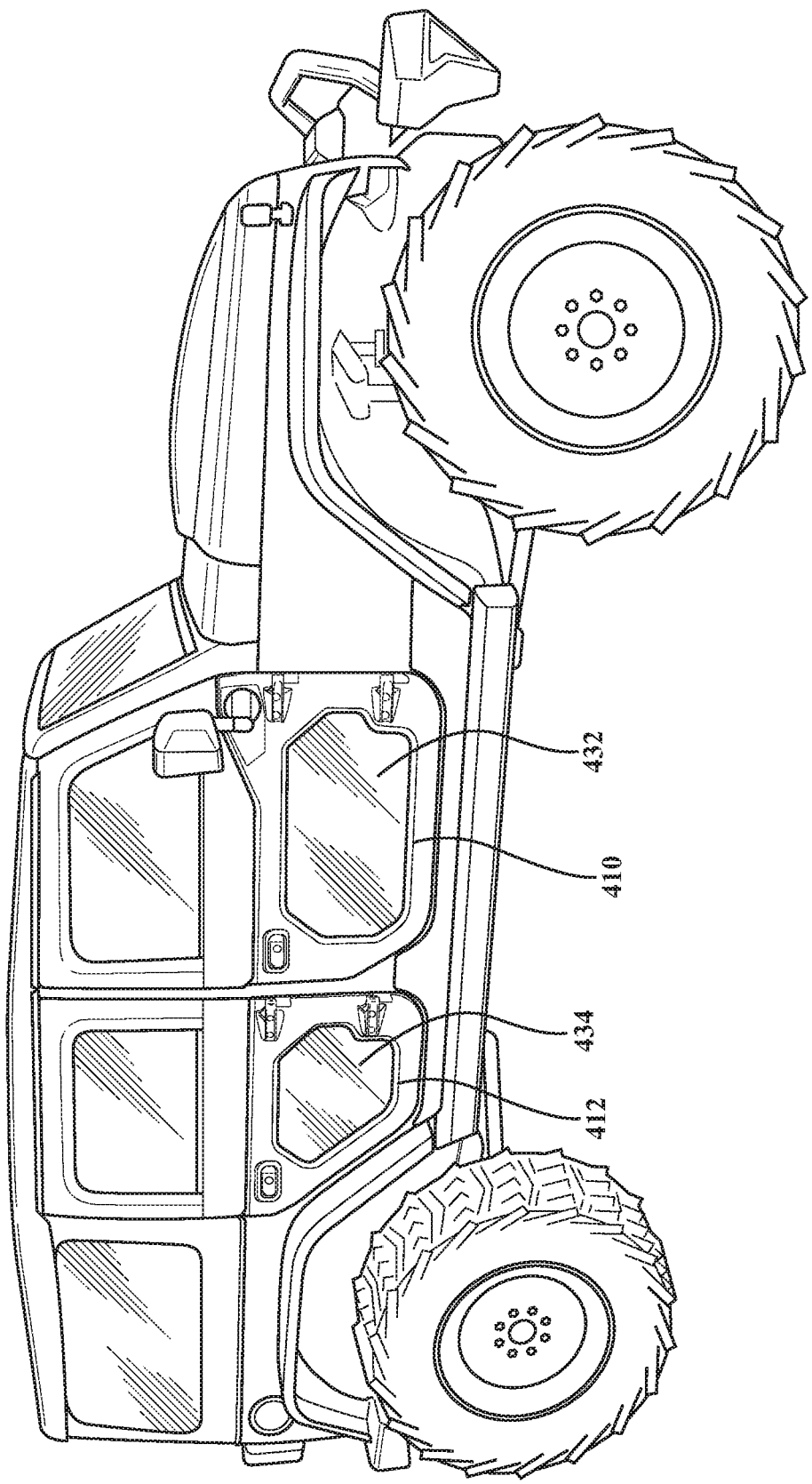
FIG. 41 is a perspective view of the side door assembly of FIG. 38 shown installed in a sport utility vehicle, including an alternative panel that is transparent, in accordance with the present invention.

FIG. 41 depicts an alternative interior door panel 432 and 434 that is transparent. The material is, by way of non-limiting example, glass, vinyl, plastic, polycarbonate panel, etc.

Any alternative interior door panels, such as bump out, are contemplated depending on the application, without departure from the scope of the present invention. The side door assembly 400 is modular allowing for any combination of add on features and interior door panels to be used as desired.

The interior door panels are connected to the one-piece casting by a plurality of rotary attachment mechanisms 436 each having a tab 438 to secure the respective interior door panel to the one-piece casting. The rotary attachment mechanisms 436 are provided on the one-piece castings 414a and 414b.

To secure the interior door panel 428 to the one-piece casting 414a of the front side door assembly 410, the panel 428, taken from the interior of the vehicle is placed over the rear of the opening 426 of the casting 414a and secured by the plurality of rotary attachment mechanisms 436 and held in place by the plurality of tabs 438 pressing on the panel 428 from the direction of the vehicle interior. The other panels 428,432,434 are secured to the respective one-piece castings 414a and 414b in identical manner.

By way of non-limiting example, the rotary attachment mechanisms 436 are toggle switches.

The one-piece casting 414a includes a plurality of structural reinforcements 440 adding structure to the casting 414a. Preferably the reinforcements 440 are webs or ribs. Most preferably, the plurality of reinforcements 440 generally extend from the opening 426 wall 444 to at least one outer wall 446 of the frame 410.

The one-piece casting 414b includes a plurality of structural reinforcements 442 adding structure to the casting 414b. Preferably the reinforcements 442 are webs or ribs. Most preferably, the plurality of reinforcements 442 generally extend from the opening 426 wall 448 to at least one outer wall 450 of the frame 412.

The structural reinforcements 440 and 442 give strength where needed. Preferably, the structural reinforcements 440 and 442 extend from every side of the opening wall.

Figure 39:
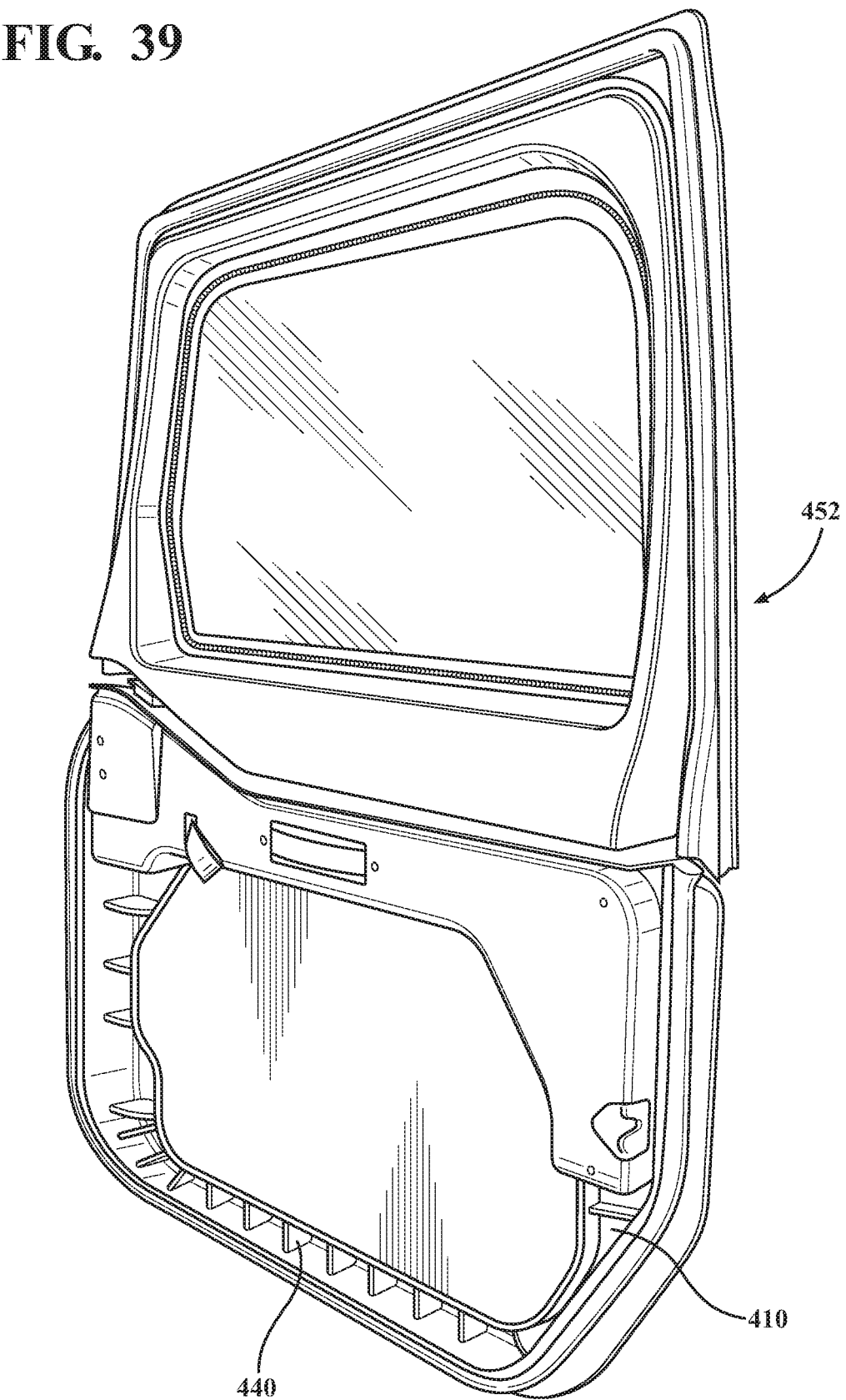
FIG. 39 is a perspective view of the front side door assembly shown in FIG. 38 taken from the inside of the vehicle, and additionally having a window frame providing a full door, according to the present invention.
Figure 40:
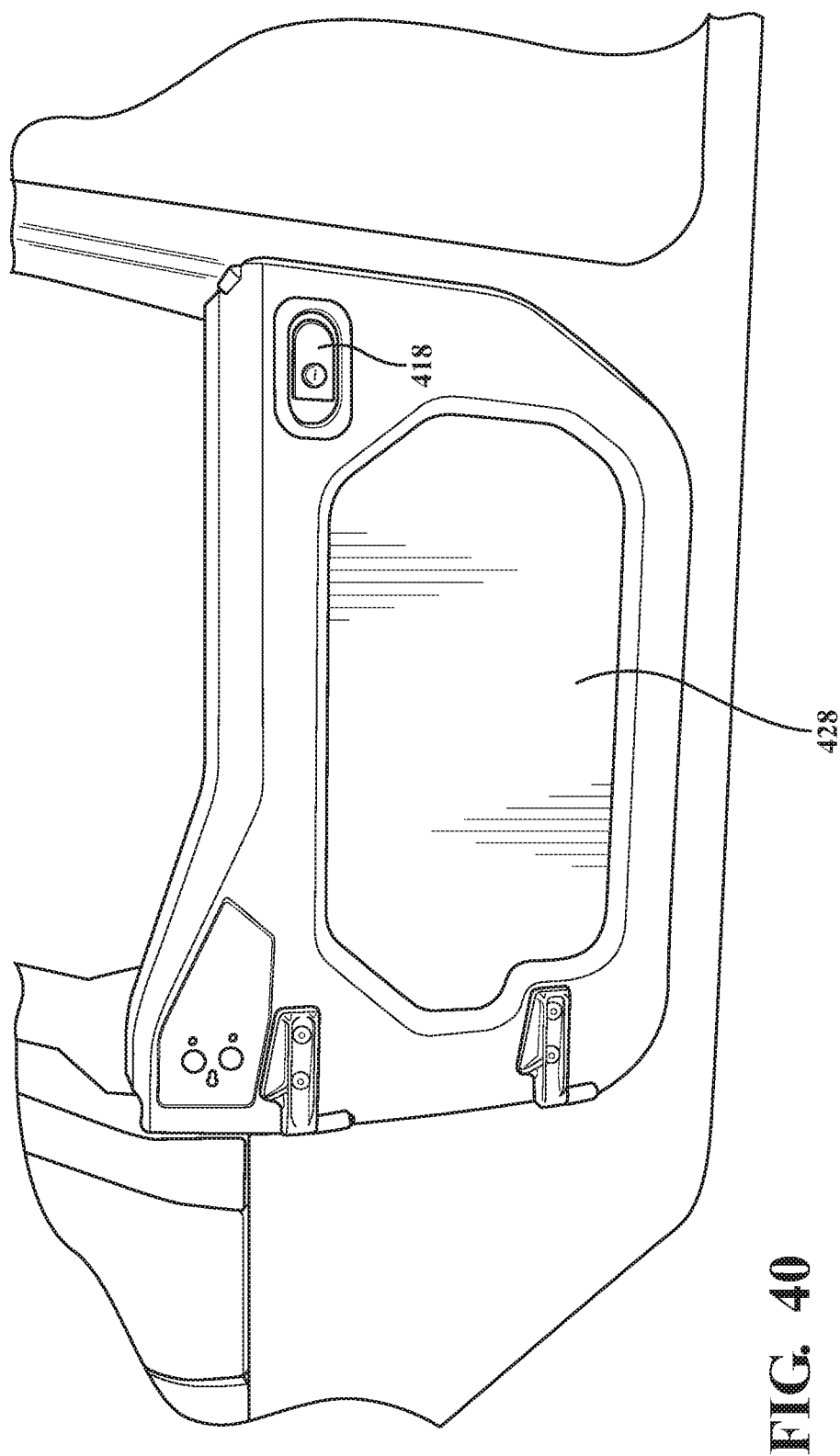
FIG. 40 is a perspective view of the front modular door of the side door assembly of FIG. 38 taken from outside of the vehicle, shown installed in a sport utility vehicle, according to the present invention.

FIG. 39 is essentially identical to the door assembly 410 however FIG. 39 additionally has an added window frame depicted generally at 452 and is commonly referred to as a full door. The window frame is preferably identical as added window frame 134 described previously and is commonly referred to as a full door.

Figure 27:
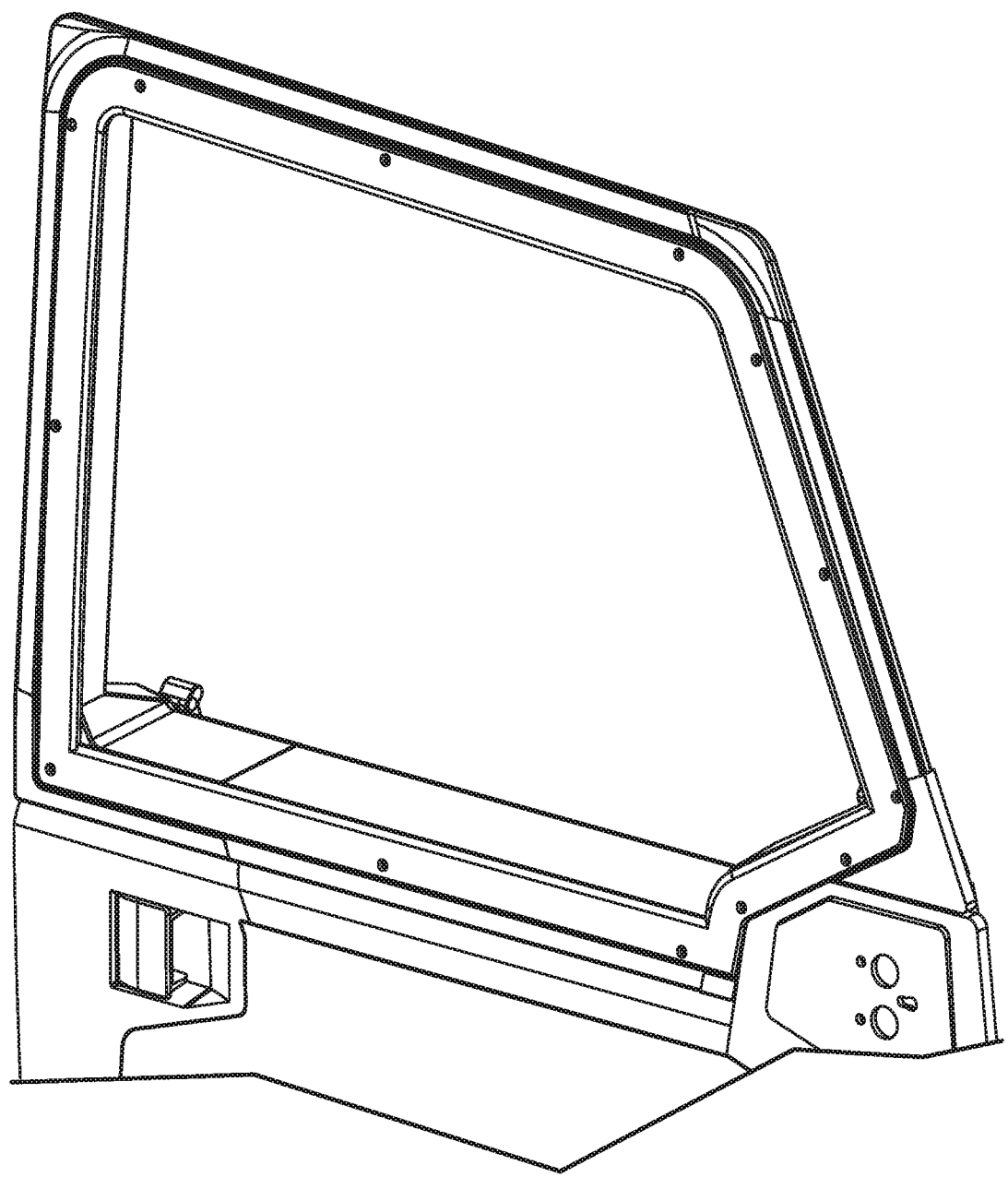
FIG. 27 is an exterior view of a portion of the door assembly illustrating the window frame of the door assembly shown in FIG. 26.
Figure 45:
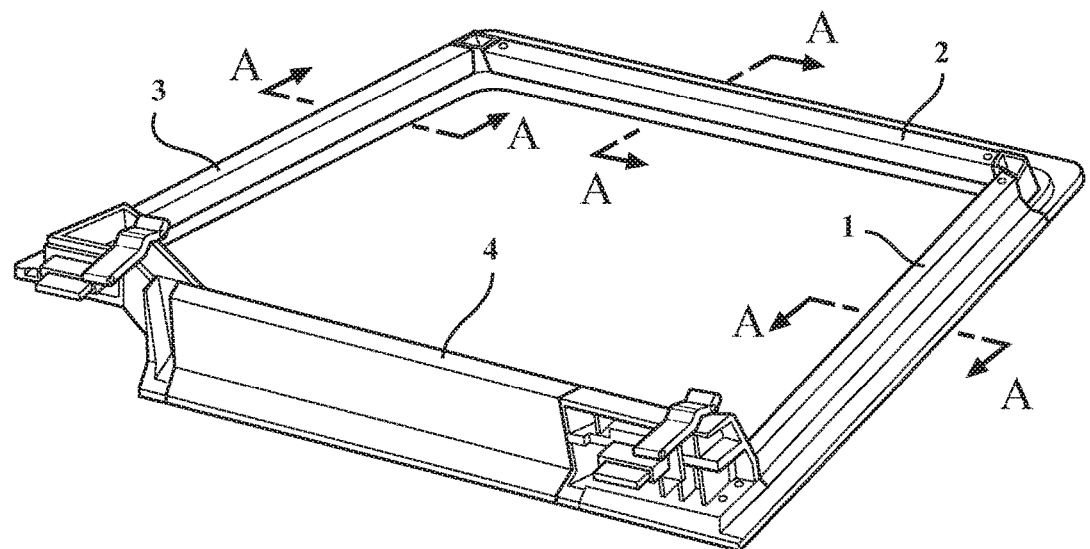
FIG. 45 is a perspective view of a window frame of a door upper half position on its side indicated similar cross sections on at least three sides, according to aspects of the present invention.
Figure 46:
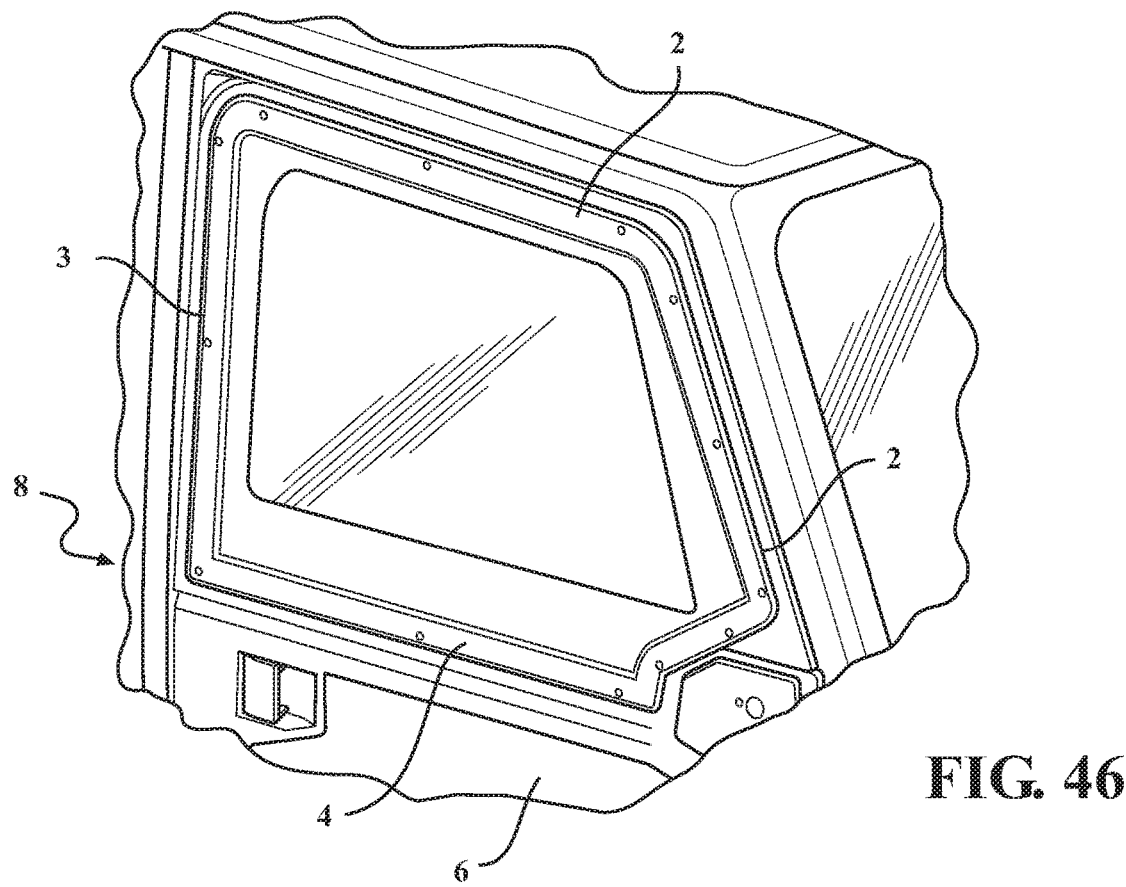
FIG. 46 is a perspective exterior view illustrating the door upper half of FIG. 45, in accordance with the present invention.

Referring now to FIGS. 45-50, there is depicted a door upper half of the door assembly including at least one structural section operably connected to at least one panel portion, operably connected window and an operably connected door seal. FIG. 45 depicts cross sections A-A on three sides (see also 1, 2, 3 of FIG. 46). It is understood that each cross section is preferably generally identical. The fourth side (see also 4 of FIG. 46), may include an identical cross section as A-A of the other sides or alternative. Alternative cross sections and variations adapted to the particular application(s) is contemplated without departure from the scope of the present invention. FIG. 46 depicts the door upper half operably connected to the door lower, as described previously, e.g., modular door lower, of the door assembly indicated generally at 8. The FIG. 27-29 cross sections. Preferably, these cross section configurations substantially run the full loop around all four sides (e.g., three 'A' sides and 4), such that the same section carries throughout all the sides of the upper half 510.

Referring generally to FIGS. 47-50, and more particularly to FIG. 47, the door upper half, shown generally at 510 includes at least one first portion 512, e.g., facade, operably connected to at least one second portion 514, e.g., structural portion. The at least one structural portion 514 is a predetermined material suitable for predetermined structural strength requirements, e.g., cast aluminum, injection molded, paintable, plastic, composite, etc and combinations thereof. The structural portion 514 gives structure and strength to the door upper half 510 and provides a plurality of mounting features or surfaces. The first portion 512 is preferably an outer panel. Any predetermined soft goods, seals, facades, panels, fasteners, etc are mountable to the structural portion 514.

The at least one first portion 512 is a facade, beauty panel, panel, outer panel, inset panel, inlaid panel, interchangeable panel, lightable panel, painted various colors, painted, graphic, stencil, backlit, incorporates lighting sources, etc and combinations thereof or any other predetermined suitable panel preferably with a show surface. The first portion 512 is fixed or, alternatively, changeable for serviceability, repair or replacement with the same or a different facade or panel design or material. Thus, the upper half 510 is modular according to an aspect of the present invention allowing for any combination of add on features and facades/panel to be used as desired.

According to an aspect of the present invention, the structural portion 514 is the same material as any previously described lower portion.

Preferably, the door upper half 510 is at least partially paintable. By way of non-limiting example, cast aluminum or injection molded upper half 510 is masked at predetermined areas and painted on class A surface(s).

The first portion 512 is made of predetermined material, including, e.g., injection molded trim, facade panel(s), cast aluminum, injection molded, painted, molded-in color, paintable flame treatable, powder coatable, chromed, electroplatable, color matched with lower modular door, etc. The first portion 512 is preferably operably bonded to the second portion 514 (e.g., see FIG. 47). Alternative attachments on predetermined surfaces are contemplated, including, adhesive, glue, clip on, press in, belt rail type attachment, T-channel, etc and combinations thereof.

The first and second portions 512 and 514 are attached, e.g., glued, adhered, bonded, and/or fastened with corresponding features, snap hook, fasteners, toggles, screws, riveted, etc and any combinations thereof.

Additional attachments are contemplated depending on the application (interior and/or exterior) including, but not limited to, additional facades, panels soft goods, grab handles, lighting, edge trim attachments and designs, weather strips, interchangeable soft good attachments (e.g., zippered window(s), riveted windows, removeable windows, 3-sided zippered windows, etc), interior trim, exterior trim, water channels, etc.

At least one seal 516 is operably connected to the door upper half 510, preferably, to the structural portion 514. The seal 516 is a door seal, (e.g., bulb seal, see FIG. 49 seal 518). Preferably, the seal 516 allows a weather tight seal to the vehicle door frame or secondary component, e.g., door rail.

A retainer plate 520 is operably connected to the structural portion 514, e.g., at least one fastener 522.

At least one attachment member 524, e.g., with plastic snap channel, is operably coupled to the structural portion 514 operable for mounting or connecting soft goods, e.g., window 526, or any other predetermined part. The window 526 is operably attached to the attachment member 524, preferably, sewn. The window 526 is provided with a zipper 528, however, alternative attachments of the window to the attachment member 524 are contemplated depending on the application without departure from the scope of the present invention. The zipper 528 is on at least three sides to zip down the window, when desired. Alternatively, on four sides to remove the window, when desired. The window 526 material is glass, vinyl, plastic, polycarbonate panel, or any other suitable material, etc. The soft goods are easily replaceable and interchangeable, as desired.

Referring generally to FIGS. 47-50, and more particularly to FIG. 48, wherein like numbers indicate like parts to FIG. 47 described previously, according to an aspect of the present invention, there is provided at least one additional support 530 for additional structural stiffness and to meet predetermined suitable properties depending on the application. The additional support 530 is located within a respective channel 532, e.g., preferably, a channel of the structural portion 514. The support 530 is operable secured within the channel 532, e.g., mechanical fit, adhesive, secured with fasteners, etc. Support 530 is at least one ring, tube, hollow tube, lightweight plastic tube, beam, metal, plastic, webbed internal structure, tube with webbed inner structure, outer wedges, wire, tether, or any other suitable cross sections for strength and combinations thereof.

Figure 49:
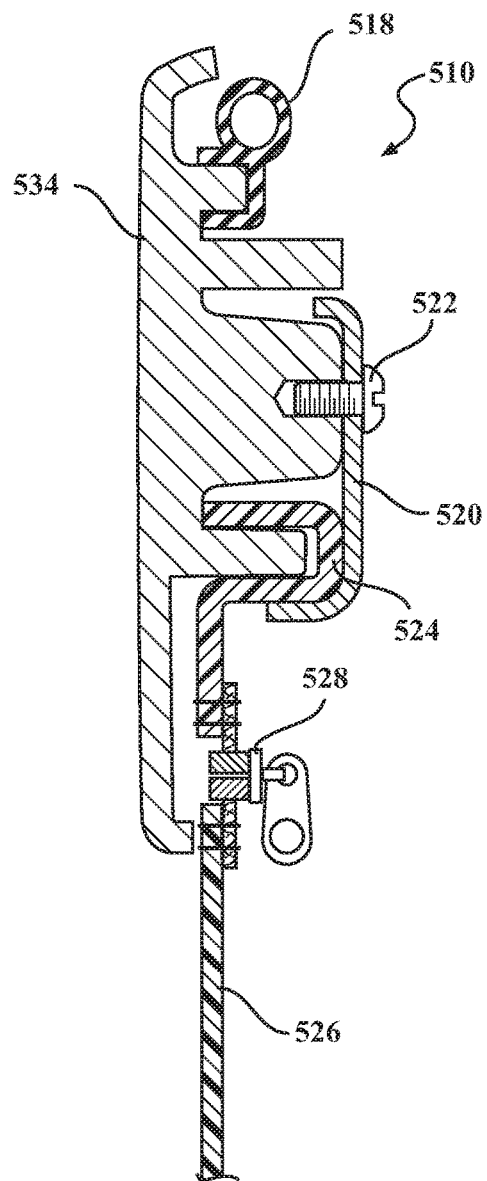
FIG. 49 is a sectional view taken at A-A of FIG. 45 including at least one outer panel incorporated with a structural portion, in accordance with aspects of the present invention.
Figure 50:
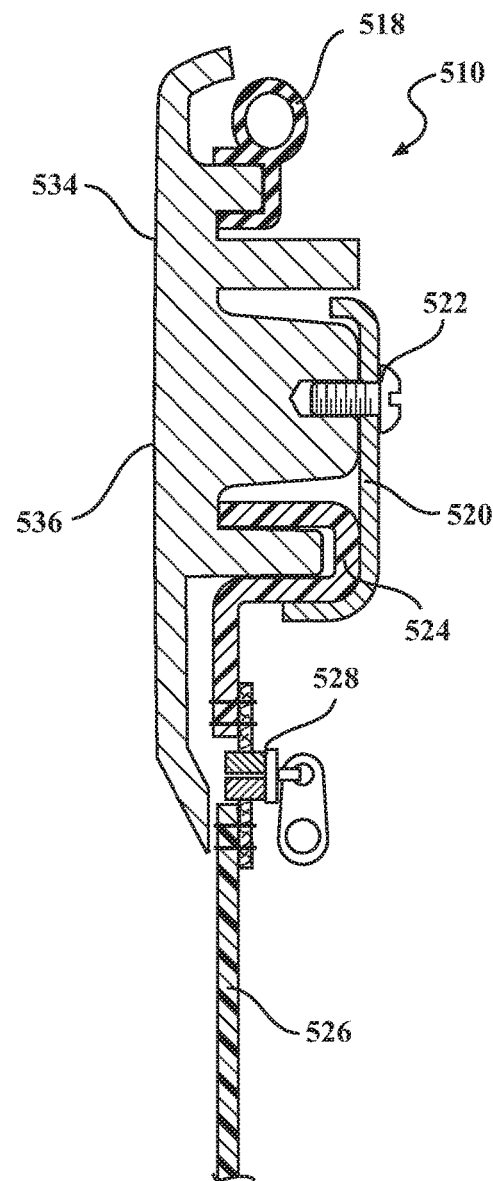
FIG. 50 is a sectional view taken at A-A of FIG. 45 including at least one outer panel incorporated with a structural portion, in accordance with aspects of the present invention.

Referring generally to FIGS. 47-50, and more particularly to FIG. 49, wherein like numbers indicate like parts to FIGS. 47-48 described previously, according to an aspect of the present invention, there is provided a structural portion 534, comprising an integrally formed first and second portion providing both the show surface 536 and structural portion. Alternative arrangement, shapes, dimensions and profiles depending on the application are contemplated without departure from the scope of the present invention (e.g., FIG. 50 illustrates an alternative profile allowing a different outer show surface 536 profile, by way of example). Preferably, the structural portion 532 is cast aluminum. The structural portion 534 takes the outer facade/beauty panel/outer panel/panel profile or alternative profile (e.g., first part 512 of FIG.

47) and incorporates the rest of the structural portion of the door upper (e.g., second part 514 of FIG. 47). This still allows attachment of the retainer 524 to the structural portion 534 and connection of soft goods, etc, as described previously and incorporated here.

At least one seal 518, e.g., bulb seal, channel seal, etc, is operably connected to the door upper half 510, preferably, to the structural portion 534. Preferably, the seal 518 allows a weather tight seal to the vehicle door frame or secondary component, e.g., door rail.

The retainer plate 520 is operably connected to the structural portion 534, e.g., with at least one fastener 522.

At least one attachment member 524, e.g., with plastic snap channel, is operably coupled to the structural portion 534 operable for mounting or connecting soft goods, e.g., window 526, or any other predetermined part. The window 526 is operably attached to the attachment member 524, preferably, sewn. The window 526 is provided with a zipper 528, however, alternative attachments of the window to the attachment member 524 are contemplated depending on the application without departure from the scope of the present invention. The zipper 528 is on at least three sides to zip down the window, when desired. Alternatively, on four sides to remove the window, when desired. The window 526 material is glass, vinyl, plastic, polycarbonate panel, or any other suitable material, etc. The soft goods are easily replaceable and interchangeable, as desired.

Referring to FIGS. 47-50 generally, the present invention allows for a unique upper set up. The cast aluminum portion and structural portion provides the main structure. The door upper half operably connects to the lower half, e.g., lower modular half, e.g., by pins or locator to socket arrangement where the upper and lower doors meet. Various attachments are contemplated depending on the application including T-channel, slide in piece, hinged attachments It is understood that the present invention is suitable and adaptable for any vehicle, including but not limited to, sport utility vehicles, motor vehicles, UTVs utility terrain vehicle, side by sides, ATVs all terrain vehicles, mid-size SUVs, off road vehicles, racing vehicles, golf karts, trucks, pickup trucks, off-road pickup trucks, Jeep™ SUVs, Jeep™ pickup trucks, marine vehicles, boats, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A side door assembly for an automotive vehicle body having a side opening, said side door assembly comprising:
    an upper door half incorporating an outer panel coupled to or integrally formed with a main structural portion;
    a window operably coupled to the structural portion of the upper door half;
    wherein the outer panel is injection molded.

2. The side door assembly of claim 1, wherein the structural portion is a cast aluminum integrally formed with an outer panel.

3. The side door assembly of claim 1, wherein the structural portion is bonded to an outer panel.

4. The side door assembly of claim 1, wherein the structural portion is bonded to an outer panel and the outer panel is paintable.

5. The side door assembly claim 1, wherein the structural portion is injection molded.

6. The side door assembly claim 1, further comprising at least one seal.

7. The side door assembly claim 1, further comprising at least one snap channel coupled to the structural portion and connected to said window for attachment of said window to said structural portion.

8. The side door assembly claim 1, further comprising a zipper attachment for said window.

9. The side door assembly claim 1, further comprising an additional structural member coupled to said main structural portion.

10. A side door assembly for an automotive vehicle body having a side opening, said side door assembly comprising:
    an upper door half including a structural portion and outer panel portion;
    at least one one-piece casting for hinged connection to the vehicle body, said casting forming a frame, and wherein said one-piece casting is also adapted to mount a rear view mirror;
    an opening in said frame allowing an opening into the interior of said vehicle; and
    at least one panel insert selectively attached to said frame of the side door assembly by a plurality of rotary attachment features to selectively attach the at least one insert panel to said casting over said opening.

11. The door assembly described in claim 10 wherein said rotary attachment features are formed on said one-piece casting.

12. The door assembly described in claim 10 wherein said rotary attachment features are provided on said one-piece casting.

13. The door assembly described in claim 10 further comprising a plurality of structural reinforcements extending from around said opening of said one-piece casting to add strength to said one-piece casting.

14. The door assembly described in claim 13, wherein said plurality of structural reinforcements are ribs.

15. The door assembly described in claim 10 wherein said castings are fabricated from a group of materials including aluminum and titanium.

16. The door assembly described in claim 10, wherein the frame includes a plurality of reinforcement features to add structure to rigidity, while reducing weight, to the side door assembly.

17. The door assembly of claim 1, wherein said door is a half door.

18. The door assembly of claim 1, wherein said door is a full door.

19. The door assembly of claim 1, further including a door paddle latch.

20. The door assembly of claim 19, wherein operating cable for said door paddle latch is routed.

21. The door assembly of claim 1 further including a window frame connected to said door assembly.

22. A side door assembly for an automotive vehicle body having a side opening, said side door assembly comprising:
    at least one one-piece casting with hinged connection to the vehicle body, said casting forming a frame;
    an opening in said frame allowing an opening into the interior of said vehicle; and
    at least one panel insert selectively attached to said frame of the side door assembly by a plurality of rotary attachment features to selectively attach the at least one insert panel to said casting over said opening; and
    an upper door half including a structural portion and outer panel portion.

* * * * *